United States Patent
Dickey et al.

(10) Patent No.: US 10,342,028 B2
(45) Date of Patent: Jul. 2, 2019

(54) ZIGBEE, THREAD AND BLE CO-EXISTENCE WITH 2.4 GHZ WIFI

(71) Applicant: Silicon Laboratories Inc., Austin, TX (US)

(72) Inventors: Terry Lee Dickey, Pflugerville, TX (US); Hendricus DeRuijter, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 11 days.

(21) Appl. No.: 15/658,942

(22) Filed: Jul. 25, 2017

(65) Prior Publication Data

US 2017/0325252 A1 Nov. 9, 2017

Related U.S. Application Data

(63) Continuation-in-part of application No. 15/084,125, filed on Mar. 29, 2016, now Pat. No. 9,980,277.

(51) Int. Cl.
| | |
|---|---|
| *H04L 1/16* | (2006.01) |
| *H04W 4/80* | (2018.01) |
| *H04W 72/12* | (2009.01) |
| *H04W 72/14* | (2009.01) |
| *H04W 84/12* | (2009.01) |
| *H04W 88/06* | (2009.01) |

(52) U.S. Cl.
CPC ........ *H04W 72/1215* (2013.01); *H04L 1/1685* (2013.01); *H04W 4/80* (2018.02); *H04W 72/14* (2013.01); *H04W 84/12* (2013.01); *H04W 88/06* (2013.01); *Y02D 70/00* (2018.01); *Y02D 70/142* (2018.01); *Y02D 70/144* (2018.01); *Y02D 70/162* (2018.01)

(58) Field of Classification Search
CPC ..... H04W 84/12; H04W 4/008; H04W 88/02; H04L 63/061; H04L 41/0816; H04L 63/0435; H04L 63/0442
See application file for complete search history.

(56) References Cited

U.S. PATENT DOCUMENTS

| | | | |
|---|---|---|---|
| 9,980,277 B2 | 5/2018 | Dickey et al. | |
| 2005/0063416 A1* | 3/2005 | Shin | H04W 88/06 370/465 |
| 2008/0287158 A1* | 11/2008 | Rayzman | H04W 72/06 455/552.1 |

(Continued)

OTHER PUBLICATIONS

Notice of allowance dated Feb. 8, 2018 in co-pending U.S. Appl. No. 15/084,125.

(Continued)

*Primary Examiner* — Jung H Park
(74) *Attorney, Agent, or Firm* — Nields, Lemack & Frame, LLC

(57) ABSTRACT

A system and method of minimizing interference and retries in an environment where two or more network protocols utilize the same frequency spectrum is disclosed. A lower-power network controller is co-located with a WIFI controller. The lower-power network controller parses incoming packets as they are received and generates a request signal once it is determined that the incoming packet is destined for this device. This maximizes the likelihood that no WIFI traffic will occur while the incoming packet is being received.

21 Claims, 17 Drawing Sheets

(56) References Cited

U.S. PATENT DOCUMENTS

| | | |
|---|---|---|
| 2011/0310741 A1* | 12/2011 | Ko ................... H04W 84/12 |
| | | 370/235 |
| 2016/0365885 A1 | 12/2016 | Honjo et al. |
| 2017/0290035 A1 | 10/2017 | Dickey et al. |
| 2017/0290038 A1 | 10/2017 | Dickey et al. |
| 2018/0242341 A1 | 8/2018 | Dickey et al. |

OTHER PUBLICATIONS

Office action dated Sep. 22, 2017 in co-pending U.S. Appl. No. 15/084,125.
"AR6102 Wi-Fi solution designed for portable consumer electronics devices," Qualcomm, 3 pages, 2013.
"Single-Chip IEEE 802.11 b/g/n MAC/Baseband/Radio + SDIO," Data Sheet, Broadcom Corporation, 82 pages, Feb. 13, 2015.
"IEEE Standards 802.15.2 Part 15.2: Coexistence of Wireless Personal Area Networks with Other Wireless Devices Operating in Unlicensed Frequency Bands," IEEE Computer Society, 115 pages, Aug. 28, 2003.
Office action dated Sep. 17, 2018 in co-pending U.S. Appl. No. 15/591,594.
Notice of allowance dated Feb. 11, 2019 in co-pending U.S. Appl. No. 15/591,594.

\* cited by examiner

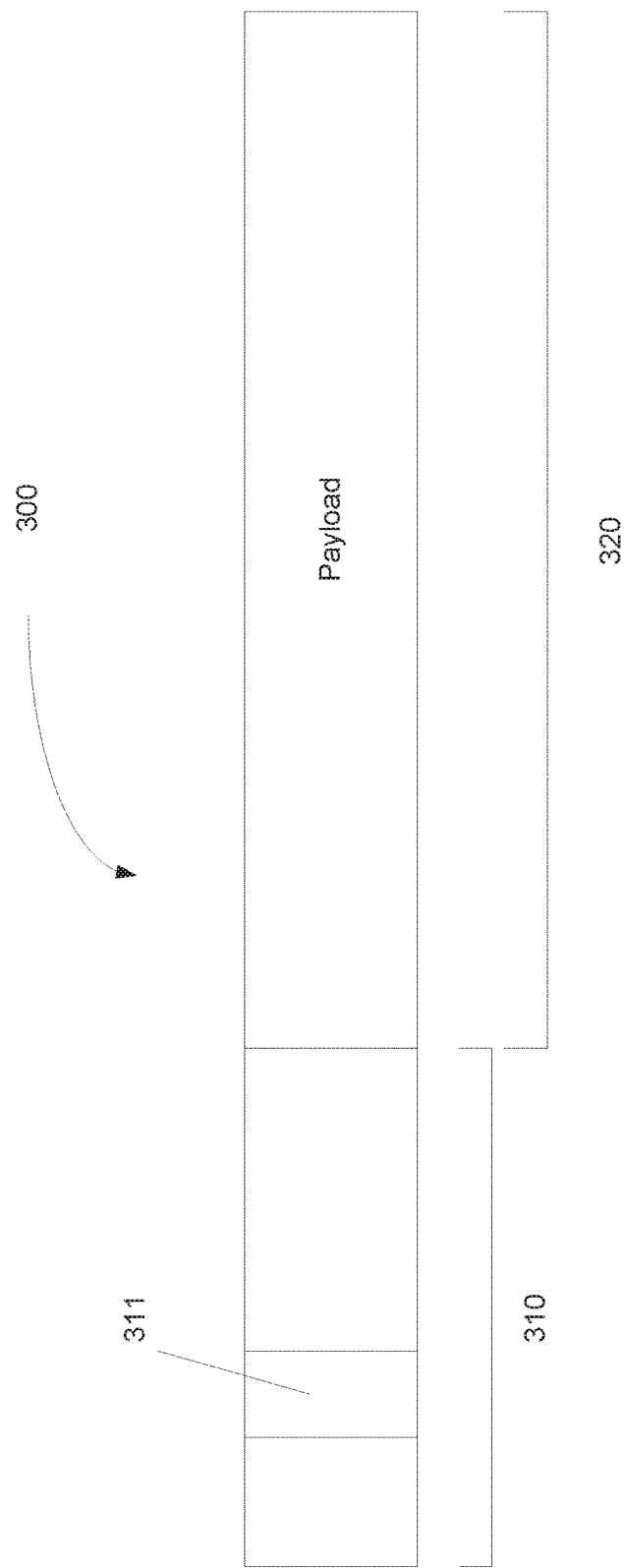

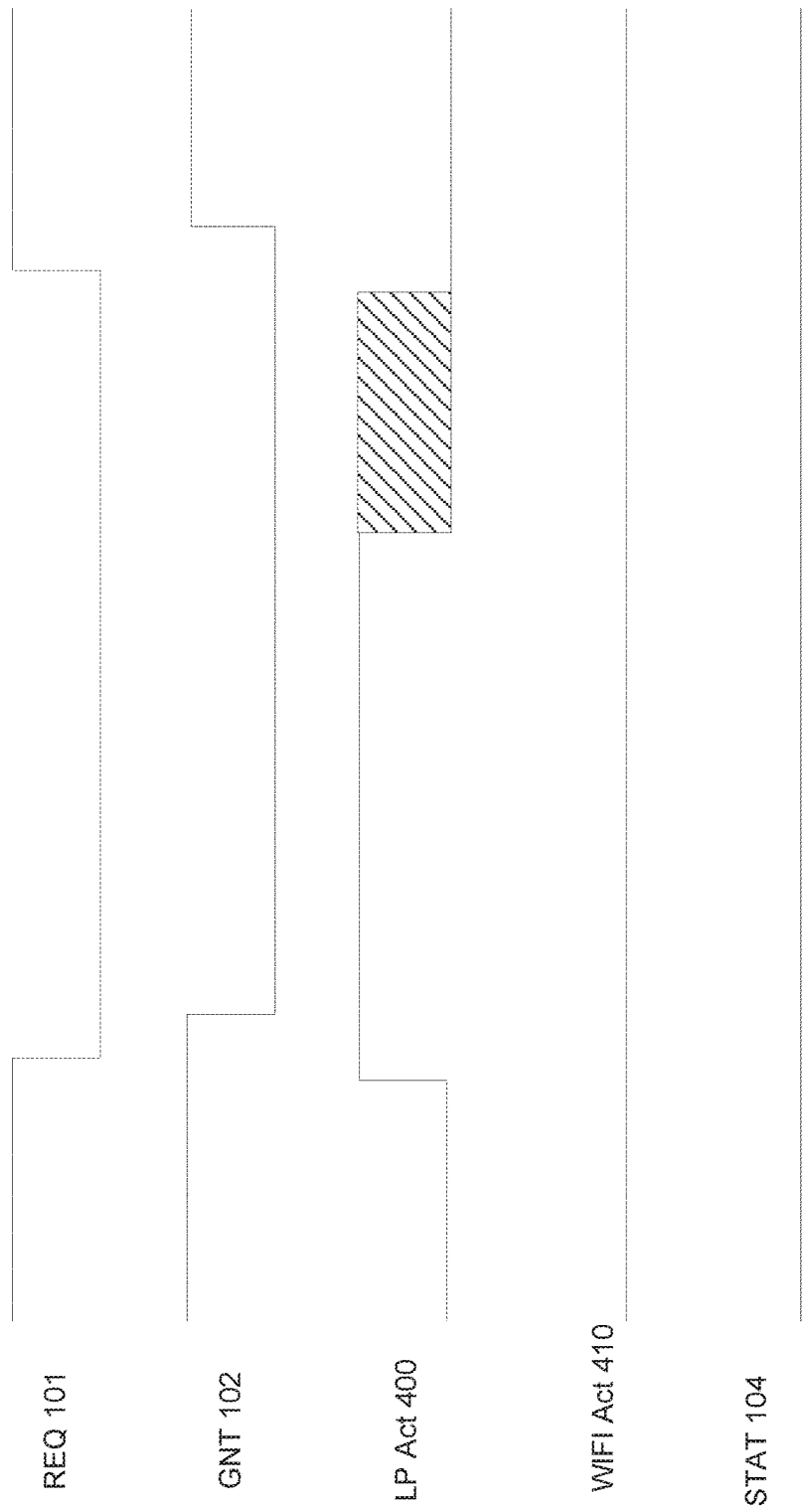

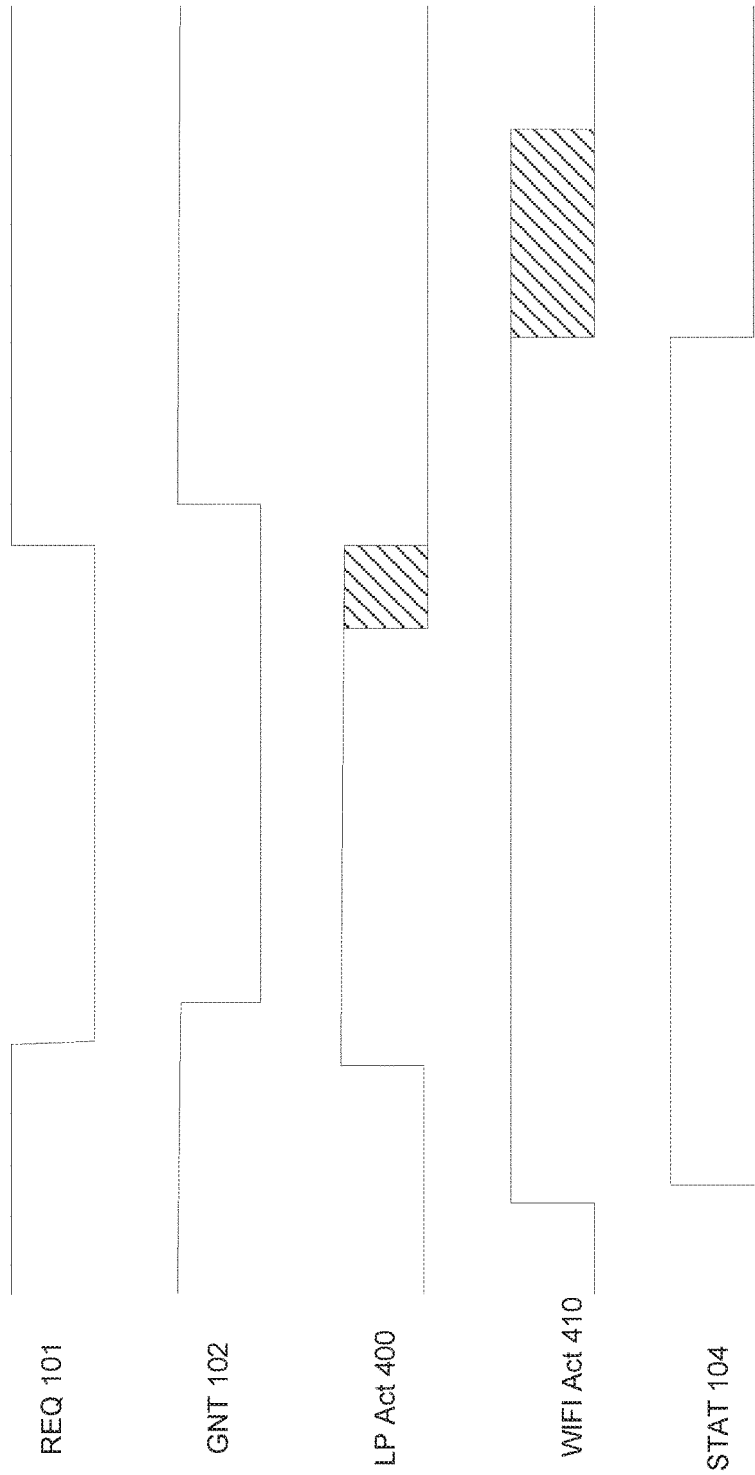

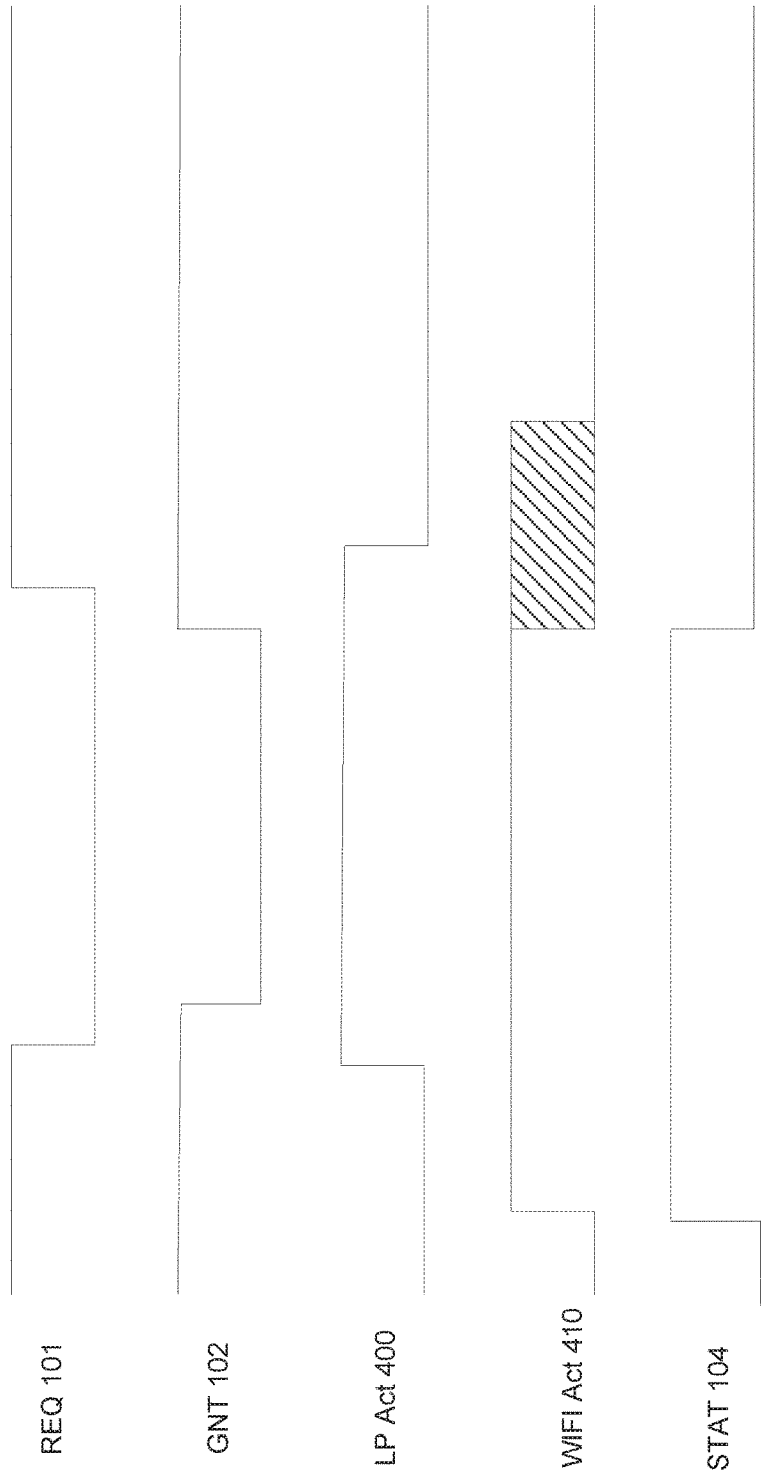

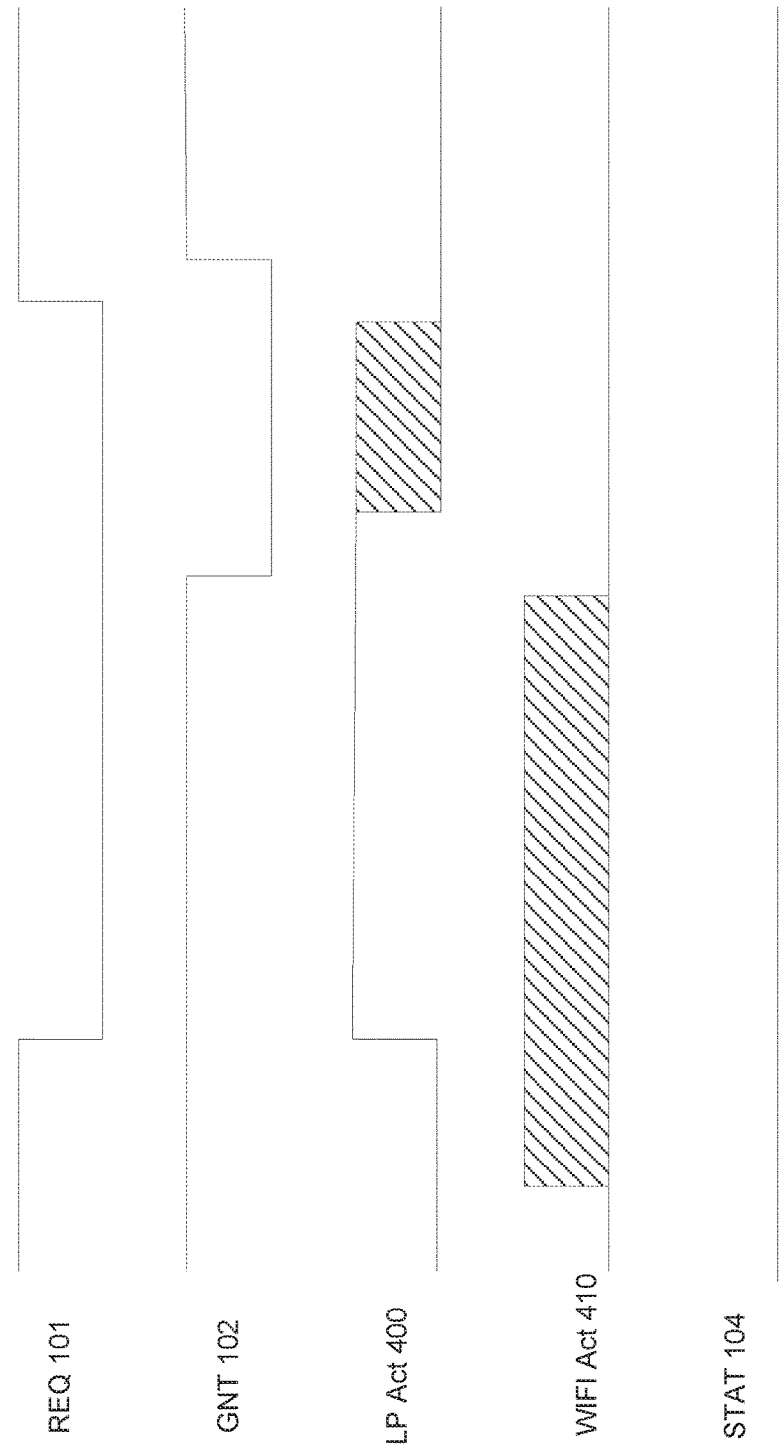

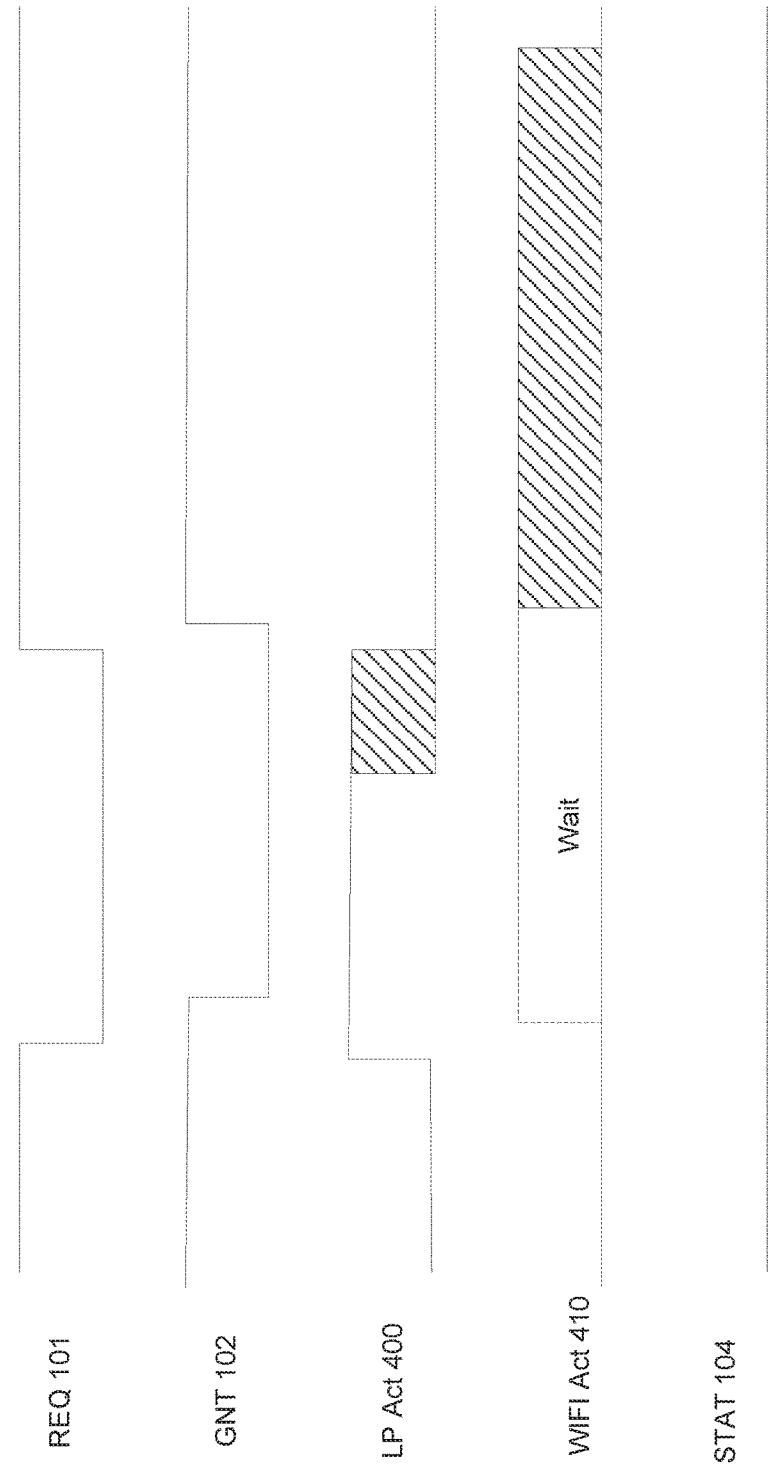

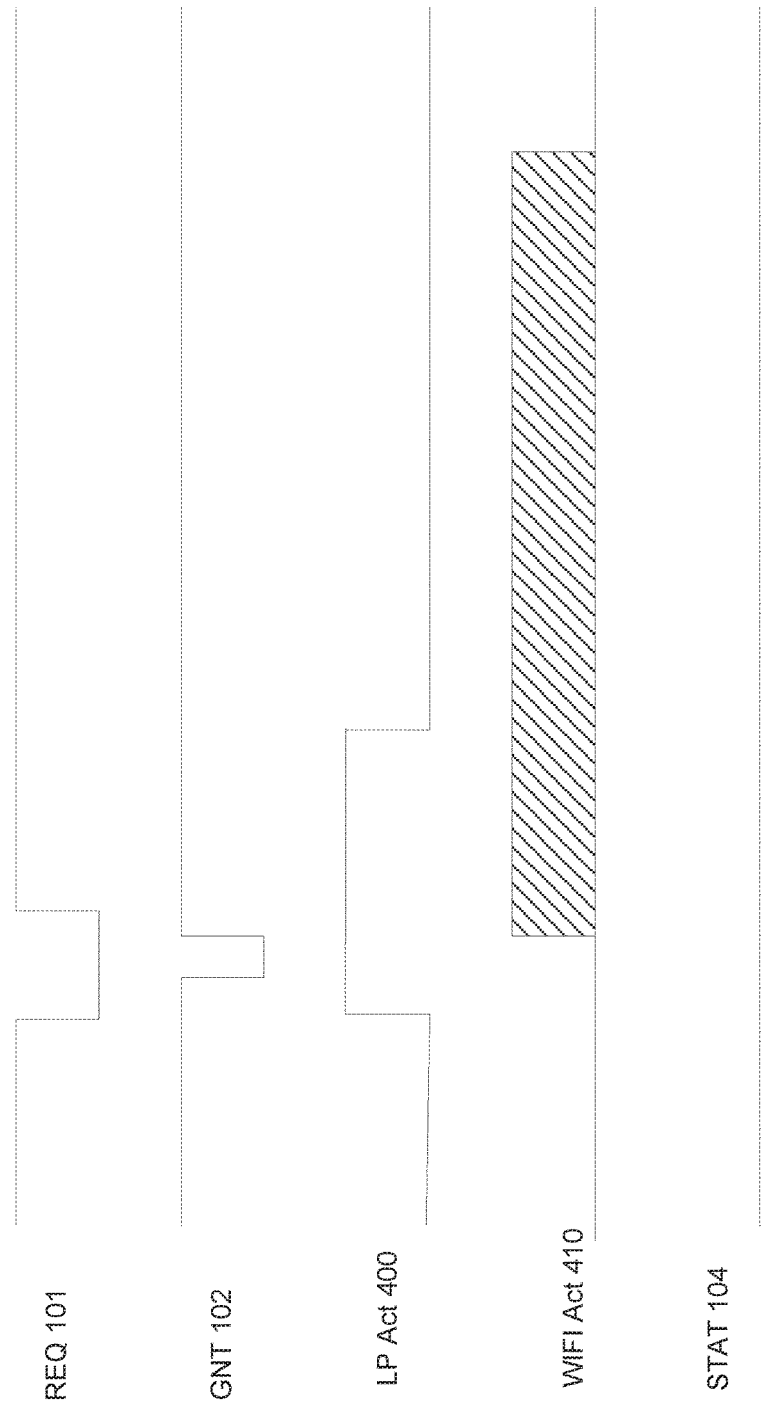

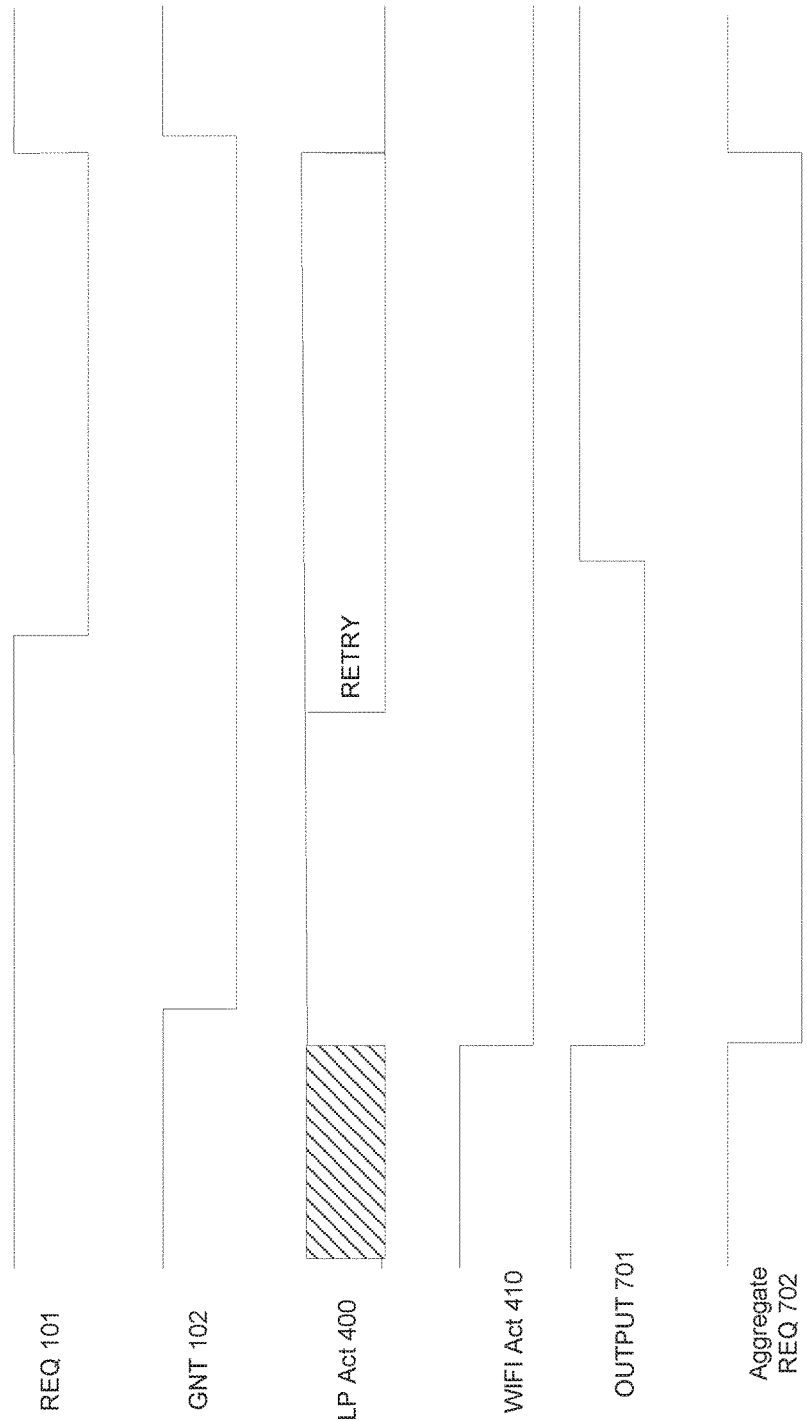

us 10,342,028 B2

ZIGBEE, THREAD AND BLE CO-EXISTENCE WITH 2.4 GHZ WIFI

This application is a continuation-in-part of U.S. patent application Ser. No. 15/084,125, filed Mar. 29, 2016, (now U.S. Pat. No. 9,980,277 issued May 22, 2018), the disclosure of which is incorporated by reference in its entirety.

FIELD

This disclosure describes systems and methods allowing the co-existence of multiple network protocols in close proximity to one another, and more specifically, the co-existence of ZigBee, Thread or Bluetooth and 2.4 GHz WiFi.

BACKGROUND

The proliferation of networks, especially in the 2.4 GHz frequency band, has led to challenges for those attempting to utilize multiple network protocols. For example, ZigBee, Thread and BlueTooth Low Energy all operate in the 2.4 GHz spectrum, and are considered low power protocols. However, WiFi, which has much higher transmission power levels, also operates in this frequency spectrum. Consequently, these various protocols may interfere with one another, resulting in reductions in throughput or data loss.

However, currently, most solutions to this problem are unmanaged, meaning that customers are asked to maximize RF isolation. This may be done by attempting to physically separate the antennas associated with each network protocol. Alternatively or additionally, the networks may be set up on separate channels within the 2.4 GHz frequency spectrum to attempt to reduce isolation requirements. Finally, the number of retries allowed for each network protocol may be maximized, thereby using retransmissions to serve as a safety net in case the other techniques do not yield the required RF isolation.

In addition, recent market trends are to reduce the space required to implement these various protocols. One way of doing this is to co-locate multiple antennas within a single device. For example, gateways and other devices that include WiFi and one or more other network protocols are becoming increasingly popular.

The unmanaged approaches that are currently used are insufficient to address these issues associated with co-existence of multiple network protocols. Therefore, there is a need for a more managed and planned approach to co-located networks which operate in the same frequency spectrum.

SUMMARY

A system and method of minimizing interference and retries in an environment where two or more network protocols utilize the same frequency spectrum is disclosed. A lower-power network controller is co-located with a WIFI controller. The lower-power network controller parses incoming packets as they are received and generates a request signal once it is determined that the incoming packet is destined for this device. This maximizes the likelihood that no WIFI traffic will occur while the incoming packet is being received.

In one embodiment, a system is disclosed. The system comprises a WIFI controller, comprising a request signal used as an input to request exclusive access to a shared medium and a grant signal used as an output indicating that the exclusive access to the shared medium has been granted; and a lower-power network controller, comprising a processing unit and an associated memory element, wherein the lower-power network controller is configured to: parse a lower-power network packet as it is received; identify that the lower-power network packet is destined for this controller as it is being received; and assert the request signal if the lower-power network packet is destined for this controller, wherein the assertion is performed before the entire packet has been received. In certain embodiments, the lower-power network controller is further configured to transmit an acknowledgement packet after the lower-power network packet has been received only if the grant signal is active. In some embodiments, the WIFI controller and the lower-power network controller operate in the same frequency spectrum. In certain embodiments, the WIFI controller further comprises a status signal used as an output to indicate whether the WIFI controller is active. In certain embodiments, the lower-power network controller is further configured to not transmit an acknowledgement packet after the lower-power network packet has been received if the grant signal is not active or the WIFI controller is active.

In another embodiment, a system is disclosed. The system comprises a WIFI controller, comprising a request signal used as an input to request exclusive access to a shared medium and a grant signal used as an output indicating that the exclusive access to the shared medium has been granted; and a lower-power network controller, comprising a processing unit and an associated memory element, wherein the lower-power network controller is configured to: assert the request signal when the lower-power network controller determines that a lower-power network packet is being received; parse the lower-power network packet to determine if the lower-power network packet is destined for this controller; and deassert the request signal if it is determined that the lower-power network packet is not destined for this controller. In certain embodiments, the lower-power network packet comprises a header containing a destination address, and the request signal is deasserted by the lower-power network controller after receiving the destination address and determining that the lower-power network packet is not destined for this controller.

In another embodiment, a system is disclosed. The system comprises a WIFI controller, comprising a request signal used as an input to request exclusive access to a shared medium and a grant signal used as an output indicating that the exclusive access to the shared medium has been granted; and a lower-power network controller, comprising a processing unit and an associated memory element, wherein the lower-power network controller is configured to: determine when there is a lower-power network packet to transmit; calculate a random delay to be used by the lower-power network controller prior to attempting to transmit the packet on the shared medium; and assert the request signal a predetermined amount of time after determining that there is a lower-power network packet to transmit, wherein the predetermined amount of time is determined based on the random delay. In certain embodiments, the predetermined amount of time is less than the random delay by a predetermined value.

In another embodiment, a system is disclosed. The system comprises a WIFI controller, comprising an aggregate request signal used as an input to request exclusive access to a shared medium and a grant signal used as an output indicating that the exclusive access to the shared medium has been granted; a lower-power network controller, comprising a processing unit and an associated memory element, wherein the lower-power network controller is configured to assert a request signal if an incoming lower-power network packet is destined for this controller or if an outgoing lower-power network packet is to be transmitted; and an early packet detection block to detect a lower-power network signal on the shared medium and assert a request signal for a predetermined duration in response to the detection. In some embodiments, the predetermined duration is sufficiently long for a lower-power network packet to be re-transmitted. In some embodiments, the early packet detection block monitors phase and amplitude of signals on the shared medium to detect a lower-power network signal.

In another embodiment, a system is disclosed. The system comprises a WIFI controller, comprising an aggregate request signal used as an input to request exclusive access to a shared medium and a grant signal used as an output indicating that the exclusive access to the shared medium has been granted; a lower-power network controller, comprising a processing unit and an associated memory element, wherein the lower-power network controller is configured to assert a request signal if an incoming lower-power network packet is destined for this controller or if an outgoing lower-power network packet is to be transmitted; and an early packet detection block to detect a lower-power network signal on the shared medium and assert a request signal for a predetermined duration in response to the detection, wherein the lower-power network controller comprises circuitry, configurable to operate in two modes; a first mode where it operates as the early packet detection block and a second mode where it operates in a normal operating mode where a header of the lower-power network packet is detected and decoded. In some embodiments, the lower-power network controller switches from the first mode to the second mode after the early packet detection block asserts the request signal. In some embodiments, the lower-power network controller switches from the second mode to the first mode after the lower-power network controller determines the lower-power network packet is not destined for this device or after the lower-power network packet has been received.

According to another embodiment, a method of simultaneously operating a WIFI network and a lower-power network is disclosed. The method comprises monitoring a shared medium for lower-power network signals; asserting a first request signal to a WIFI controller for a predetermined duration when a lower-power network signal is detected; using a lower-power network controller to determine that an incoming lower-power network packet is being received and is intended for this lower-power network controller; asserting a second request signal if the incoming lower-power network packet is intended for this lower-power network controller; and asserting a grant signal from the WIFI controller in response to the request, wherein the WIFI controller suspends transmission of outgoing packets while the request signal is asserted.

BRIEF DESCRIPTION OF THE DRAWINGS

For a better understanding of the present disclosure, reference is made to the accompanying drawings, in which like elements are referenced with like numerals, and in which:

FIG. 3 is a representative lower-power network packet;

FIG. 4A-4G are timing diagrams representing different scenarios;

FIGS. 8A-8B are timing diagrams representing different scenarios using the system of FIG. 7.

DETAILED DESCRIPTION

Figure 1:
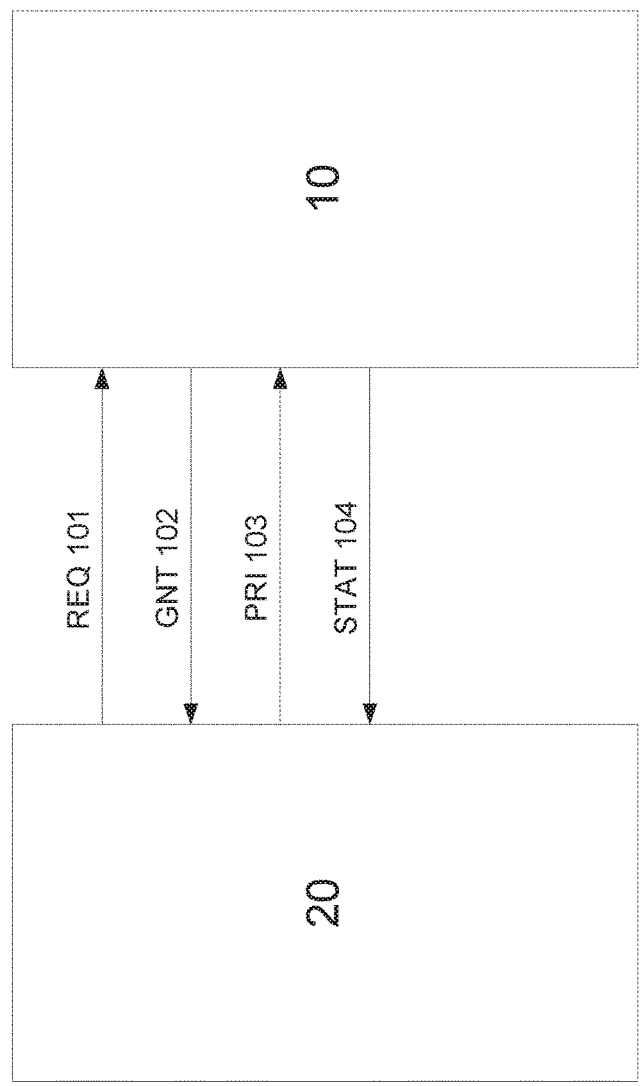
FIG. 1 is a block diagram of a system having both a WIFI controller and a lower-power network controller.

FIG. 1 shows a block diagram of a system having a WIFI network controller and a lower-power network controller. Throughout this disclosure, the term "lower-power network" is used to refer to any network protocol that operates in the same frequency spectrum as the WIFI network, and uses lower power. For example, ZIGBEE®, Thread, Bluetooth®, and Bluetooth Low Energy (BLE) all operate in the same 2.4 GHz frequency spectrum as WiFi. Other network protocols layered on IEEE 802.15.4 would also operate in the 2.4 GHz frequency spectrum. Further, although reference is made throughout this disclosure to 2.4 GHz, it is understood that the techniques and systems described herein are applicable to any frequency spectrum where both high power devices and lower power network co-exist.

FIG. 1 shows a WIFI controller 10 and a lower-power network controller 20. While FIG. 1 shows these devices as being two separate devices, it is understood that in certain embodiments, these devices may be incorporated into a single integrated circuit. Thus, FIG. 1 illustrates the interface between these components, regardless of the physical implementation of these components.

Within the IEEE 802.15.2 standard, an arbitration mechanism is defined. This mechanism, known as Packet Traffic Arbitration (PTA), allows other lower-power network controllers to request access to the shared medium from the WIFI controller. The shared medium is typically the air. The mechanism includes a request signal (REQ) 101 which in an indication from the lower-power network controller 20 that it wishes to access the shared medium. The protocol also includes a grant signal (GNT) 102, indicating that the WIFI controller 10 has allowed another device to use the shared medium. In certain embodiments, the mechanism includes a priority signal (PRI) 103, which is used to indicate the importance of the packet that the lower-power network controller 20 wishes to transmit. Finally, in certain embodiments, the mechanism includes a status signal (STAT) 104, which indicates the status of the WIFI controller 10. In certain embodiments, this STAT signal 104 may be asserted when the WIFI controller 10 is receiving a packet and deasserted at all other times. In other embodiments, the STAT signal 104 may be asserted whenever the WIFI controller 10 is transmitting or receiving.

Further, while FIG. 1 shows the arbitration logic contained within the WIFI controller, other embodiments are also possible. For example, the packet arbitration logic may be a separate component, separate from the lower-power network controller 20 and the WIFI controller 10.

Traditionally, the lower-power network controller 20 asserts the REQ signal 101 whenever it wishes to transmit a packet over the shared medium. In response, the WIFI controller 10 asserts the GNT signal 102 when it is no longer active. After the lower-power network controller 20 has completed transmitting its packet, it then deasserts the REQ signal 101, indicating that it no longer needs access to the shared medium. The WIFI controller 10 then deasserts the GNT signal 102.

However, this mechanism has drawbacks. For example, if the lower-power network controller 20 is receiving a packet, and the WIFI controller 10 begins transmission of a new packet during that reception, it is likely that the packet being received by the lower-power network controller 20 will be corrupted. Further, even if the incoming packet is not corrupted, the lower-power network controller 20 will be unable to transmit an acknowledgement (ACK) back to the transmitting node. Consequently, even if the lower-power network packet were successfully received, it will be treated as a failure and retries will be incurred.

The present disclosure proposes a unique usage of the PTA mechanism to reduce retries and interference, with minimal impact on WIFI performance.

Figure 2:
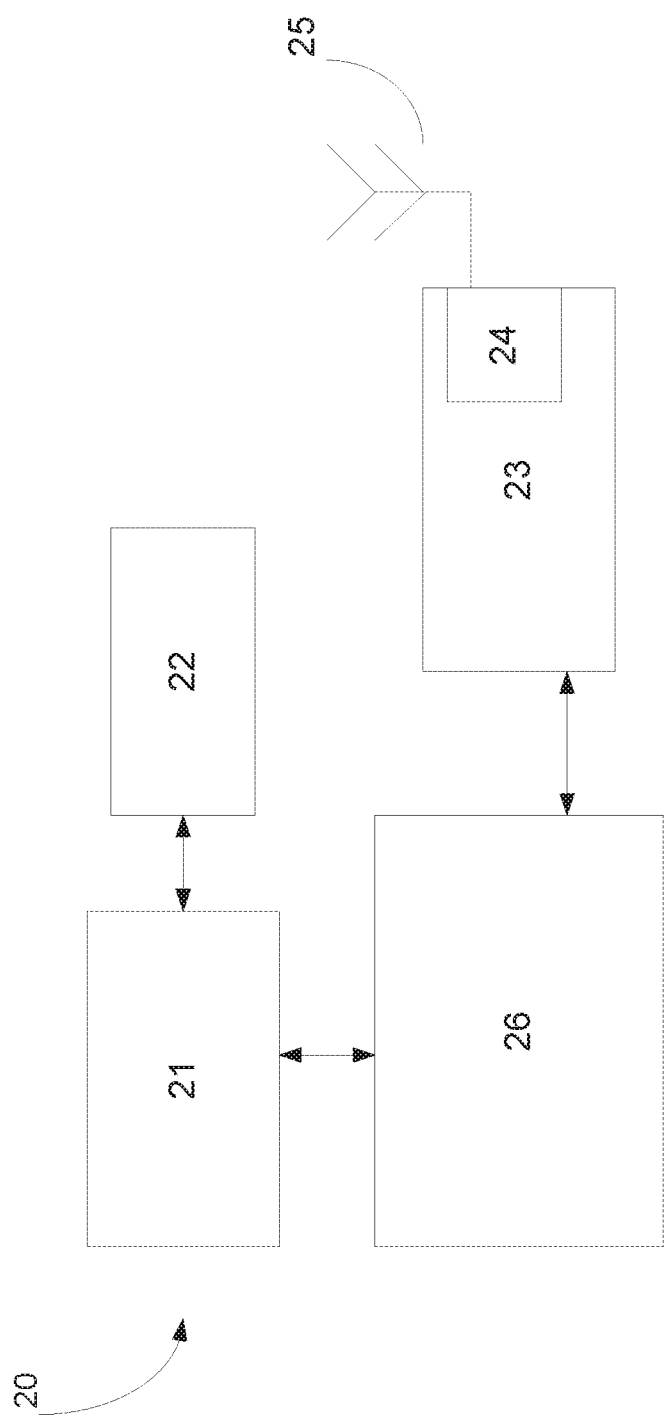
FIG. 2 is a block diagram of the lower-power network controller.

FIG. 2 shows a block diagram of a representative lower-power network controller 20. The lower-power network controller 20 has a processing unit 21 and an associated memory device 22. This memory device 22 contains the instructions, which, when executed by the processing unit, enable the lower-power network controller 20 to perform the functions described herein. This memory device 22 may be a non-volatile memory, such as a FLASH ROM, an electrically erasable ROM or other suitable devices. In other embodiments, the memory device 22 may be a volatile memory, such as a RAM or DRAM. The lower-power network controller 20 also includes a network interface 23, which is typically a wireless interface including an antenna 25. Additionally, the network interface may comprise a radio 24, which includes the baseband processing and MAC level processing. The lower-power network controller 20 may include a second memory device 26 in which data that is received by the network interface 23, and data that is to be transmitted by the network interface 23, is stored. This second memory device 26 is traditionally a volatile memory. The processing unit 21 has the ability to read and write the second memory device 26 so as to communicate with the other nodes in the network. Although not shown, each lower-power network controller 20 also has a power supply, which may be a battery or a connection to a permanent power source, such as a wall outlet.

FIG. 3 shows a typical incoming packet from a lower-power network. The lower-power network packet 300 includes a header 310 and a payload 320. The header 310 may further include a destination address 311. The destination address 311 is a representation of the device to which this packet is intended. For example, each lower-power network device may have a unique network identifier, which is used as the destination address. The header 310 may also include other fields, and the disclosure does not limit the other components which comprise the header.

When a lower-power network packet 300 is transmitted over the lower-power network, the receiving device may be requested to positively acknowledge receipt of the packet by transmitting an Acknowledgement (ACK) packet back to the sending device as soon as receipt is completed. Failure to transmit this ACK successfully will be treated as a failed transmission by the sending device.

FIGS. 4A-4G represent various timing diagrams that illustrate the operation of the present system in different scenarios. In these diagrams, the REQ signal 101 and the GNT signal 102 are active low, meaning that they are asserted when they are at the lower voltage and are inactive at the higher voltage.

The LP Act signal 400 represents lower-power network activity. Incoming packets are represented by an assertion of the LP Act signal 400. Outgoing communications are represented by the cross-hatched regions.

The WIFI Act signal 410 represents WIFI network activity. Incoming packets are represented by an assertion of the WIFI Act signal 410. Outgoing communications are represented by the cross-hatched regions.

The STAT signal 104 is used to represent the status of the WIFI controller 10. In certain embodiments, the STAT signal 104 is not used. In other embodiments, the STAT signal 104 is used to denote any activity, such as receiving and transmitting, by the WIFI controller 10. In the present timing diagrams, the STAT signal 104 is asserted when the WIFI controller 10 is receiving a packet, and is deasserted at all other times.

FIG. 4A shows a first timing diagram representing the receipt of a packet by the lower-power network controller 20, and the corresponding ACK that it transmitted by that device. In this scenario, there is no WIFI activity.

The sequence begins when a lower-power network packet is transmitted to this device, as shown in the LP Act signal 400. Sometime after the start of the reception of this packet, the lower-power network controller 20 asserts the REQ signal 101. More specifically, as the packet arrives, the lower-power network controller 20 begins parsing the packet. Once the destination address 311 has been received, the lower-power network controller 20 can determine whether the incoming packet is intended for this device. If the packet is not intended for this device, the lower-power network controller 20 may simply stop parsing the packet. However, if the packet is intended for this device, the lower-power network controller 20 will continue parsing the packet and will save the packet in the second memory device 26. In one embodiment, the REQ signal 101 may be asserted as early as the completion of the receipt of the destination address 311. In yet another embodiment, the REQ signal 101 may be asserted immediately upon detection of the receipt of the first byte of a lower-power network packet 300. If that packet is not intended for this device as determined based on the destination address 311, the lower-power network controller 20 will deassert the REQ signal 101. In both embodiments, the REQ signal 101 is asserted as quickly as possible to maximize the probability that the WIFI controller 10 will assert the GNT signal 102 and will not begin transmission of a WIFI packet. In other words, the lower-power network controller 20 asserts the REQ signal 101 prior to the completion of the receipt of the incoming packet. As stated above, this may be as soon as the destination address 311 is parsed by the lower-power network controller 20; however, may be any time before the completion of the receipt of the incoming lower-power network packet 300.

In certain embodiments, the parsing of the incoming lower-power network packet 300 may be done by software executed by the processing unit 21. For example, the processing unit may read the information from the packet as it is received by network interface 23. It then asserts the REQ signal 101 as described above. In other embodiments, there may be dedicated hardware disposed within the radio 24 that performs this function. In either embodiment, the lower-power network controller 20 is adapted to parse the header to determine whether the packet is destined for this device, and to assert if the packet is indeed destined for this device.

After the REQ signal 101 is asserted, the WIFI controller 10 asserts the GNT signal 102, since there is no WIFI activity. At this point, the lower-power network packet will be received without interruption. Once received, the lower-power network controller 20 may transmit an ACK packet back to the sending device, as indicated by the cross-hatched region.

Once the ACK has been transmitted, the REQ signal 101 is then deasserted by the lower-power network controller 20. This causes the WIFI controller 10 to deassert the GNT signal 102, and the transaction is complete.

FIGS. 4B-4C show scenarios where a lower-power network packet 300 is being received at the same time that a WIFI packet is being received. In these embodiments, as described above, the lower-power network controller 20 asserts the REQ signal 101 as soon as it is determined that the incoming lower-power network packet 300 is destined for this device. In this scenario, the WIFI controller 10 is also receiving a packet and therefore, the STAT signal 104 is asserted. Additionally, since the WIFI controller 10 is not transmitting, the WIFI controller 10 asserts the GNT signal 102, indicating that the lower-power network controller 20 may transmit a packet if desired.

In FIG. 4B, the receipt of the lower-power network packet 300 is completed while the WIFI packet is still being received. In one embodiment, shown in FIG. 4B, the lower-power network controller 20, noting that the GNT signal 102 is asserted, transmits the ACK packet while the WIFI controller 10 is still receiving the incoming WIFI packet. This scenario may occur, for example, if the lower-power network controller 20 does not have access to any information about the status of the WIFI controller 10. In other words, if the PTA mechanism does not include a STAT signal 104, the lower-power network controller 20 uses only the GNT signal 102 to determine whether it can transmit the ACK packet.

In another embodiment, the lower-power network controller 20 has access to the STAT signal 104 and uses this information to determine whether to transmit the ACK packet. In this embodiment, the lower-power network controller 20, noting that the STAT signal 104 is asserted, may, in some embodiments, monitor the RSSI WIFI to determine if it is safe to transmit without disrupting the WIFI reception. If the RSSI WIFI is below a certain threshold, the lower-power network controller 20 will not transmit the ACK packet to the sending device. This may cause a retry of the lower-power network packet, but will allow the WIFI packet to be received without any interference caused by the transmission of an ACK packet. If the RSSI WIFI is above a certain threshold, the lower-power network controller 20 will transmit the ACK packet.

In another embodiment, the WIFI controller 10 may be configured such that the GNT signal 102 is not asserted if the WIFI controller is transmitting or receiving. In this scenario, since the WIFI controller 10 is receiving a WIFI packet, the GNT signal 102 will not be asserted. Thus, the lower-power network controller 20 will not attempt to transmit an ACK packet. The scenario in which the GNT signal 102 is never asserted is shown later in FIG. 4D.

FIG. 4C shows a scenario where receipt of the WIFI packet is completed before completion of the lower-power network packet 300. In this scenario, the lower-power network controller 20 will assert the REQ signal 101 as soon as it is determined that the packet is intended for this device. Since the WIFI controller 10 is not transmitting a packet, it will assert the GNT signal 102. However, the WIFI controller 10 will deassert the GNT signal 102 after completion of the receipt of the incoming WIFI packet so that it may transmit an acknowledge. The deassertion of the GNT signal 102 will inform the lower-power network controller 20 that it cannot send the ACK packet back to the sending device. Thus, FIG. 4C does not illustrate an ACK packet being sent by the lower-power network controller 20. Again, this will likely result in a retry.

Figure 4D:
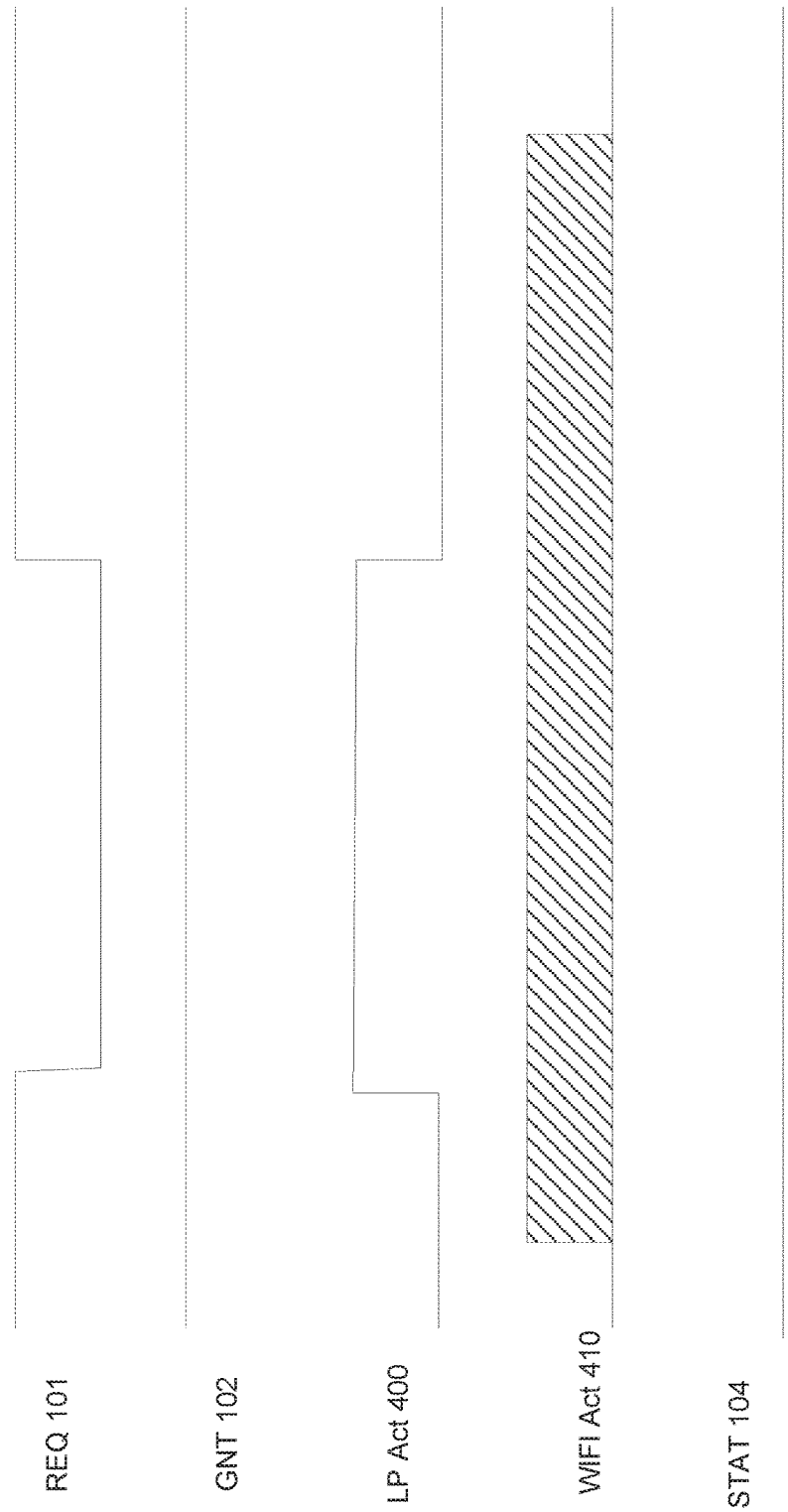

FIGS. 4D-4E show scenarios where a lower-power network packet 300 is being received at the same time that a WIFI packet is being transmitted. In these embodiments, as described above, the lower-power network controller 20 asserts the REQ signal 101 as soon as it is determined that the incoming lower-power network packet 300 is destined for this device. Since the WIFI controller 10 is transmitted, the GNT signal 102 is not asserted immediately.

In the embodiment shown in FIG. 4D, the WIFI controller 10 is still transmitting when the lower-power network controller 20 wants to transmit the ACK. However, the lower-power network controller 20 cannot transmit an ACK packet since the GNT signal 102 was never asserted. Thus, this lower-power network packet 300 will likely be retried since an ACK was never returned by the receiving device.

In the embodiment shown in FIG. 4E, the WIFI controller 10 was no longer transmitting when the lower-power network controller 20 wants to transmit the ACK. In this embodiment, the WIFI controller 10 asserted the GNT signal 102 when the transmission of the WIFI packet was complete. Since the GNT signal 102 was asserted prior to the completion of the receipt of the incoming lower-power network packet 300, the lower-power network controller 20 is able to transmit the ACK packet, as illustrated in the figure. This particular scenario may occur in several ways. First, the WIFI packet may have been completed before the lower-power network packet 300, as described above. In another embodiment, the priority of the incoming lower-power network packet 300 may be higher than the priority of the outgoing WIFI packet, as indicated by the PRI signal 103 (see FIG. 1). In this case, the WIFI controller 10 may prematurely interrupt its outgoing packet to allow the lower-power network controller 20 to transmit the ACK packet.

FIGS. 4F-4G show scenarios where the WIFI controller 10 wishes to transmit a WIFI packet while a lower-power network packet 300 is being received. Since the WIFI controller 10 is idle when the lower-power network packet 300 is first being received, the GNT signal 102 is asserted by the WIFI controller 10. FIG. 4F shows an embodiment where the priority of the WIFI packet that is to be transmitted is lower than the priority of the lower-power network packet 300 that is being received.

In this embodiment, the WIFI controller 10 simply waits until the lower-power network controller 20 deasserts the REQ signal 101. After this, the GNT signal 102 is deasserted, and the WIFI controller 10 begins transmission of its outgoing WIFI packet.

FIG. 4G shows an embodiment where the priority of the WIFI packet that is to be transmitted is higher than the priority of the lower-power network packet 300 that is being received. In this embodiment, the GNT signal 102 is asserted because, at that time, there is not activity by the WIFI controller 10. However, soon thereafter, the WIFI controller 10 wishes to transmit a packet. Since this WIFI packet has higher priority than the incoming lower-power network packet 300, the GNT signal 102 is deasserted and the WIFI controller 10 begins transmitting the outgoing WIFI packet. Since the GNT signal 102 has been deasserted, the lower-power network controller 20 cannot transmit the ACK packet.

Figure 5A:
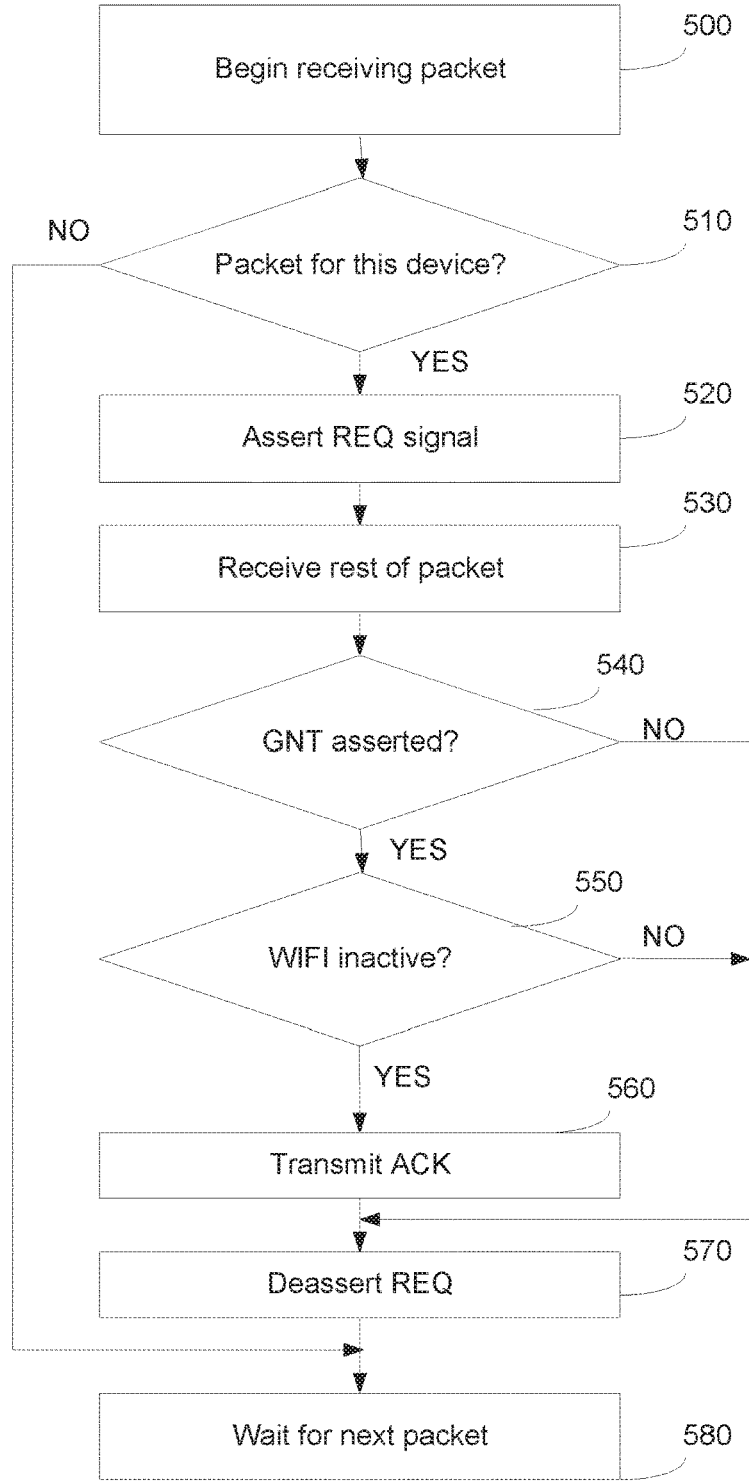
FIG. 5A-5B are representative flowcharts of the receive process for the lower-power network controller.

FIG. 5A shows a first representative flowchart which may be executed by the processing unit 21 in the lower-power network controller 20. This flowchart only pertains to incoming packets. First, as shown in Process 500, an incoming packet begins to be received by the lower-power network controller 20. The lower-power network controller 20 begins receiving the packet and parsing the header information. Specifically, the lower-power network controller 20 parses the destination address 311 in the header 310 to determine if the incoming packet is destined by this device, as shown in Process 510. If the packet is not intended for this device, the lower-power network controller 20 is done with this packet and waits for the next packet, as shown in Process 580. If, however, the packet is intended for this device, the lower-power network controller 20 asserts the REQ signal 101, as shown in Process 520. The lower-power network controller 20 then continues to receive the packet, as shown in Process 530. After the entire packet has been received, the lower-power network controller 20 verifies that the packet was correctly received. If so, the lower-power network controller 20 checks if the GNT signal 102 is asserted as shown in Process 540. If it is, then it may transmit the ACK packet. In certain embodiments, the lower-power network controller 20 may determine the status of the WIFI controller 10, such as by querying the STAT signal 104, as shown in Process 550. If the GNT signal 102 is asserted and the STAT signal 104 is not asserted, the lower-power network controller 20 transmits the ACK packet as shown in Process 560. After the ACK is transmitted, the lower-power network controller 20 deasserts the REQ signal 101, as shown in Process 570. If the GNT signal 102 is not asserted, or the STAT signal 104 is asserted, the lower-power network controller 20 deasserts the REQ signal, as shown in Process 570. At this point, the receive process is then complete, and the lower-power network controller 20 waits for the next packet, as shown in Process 580.

Figure 5B:
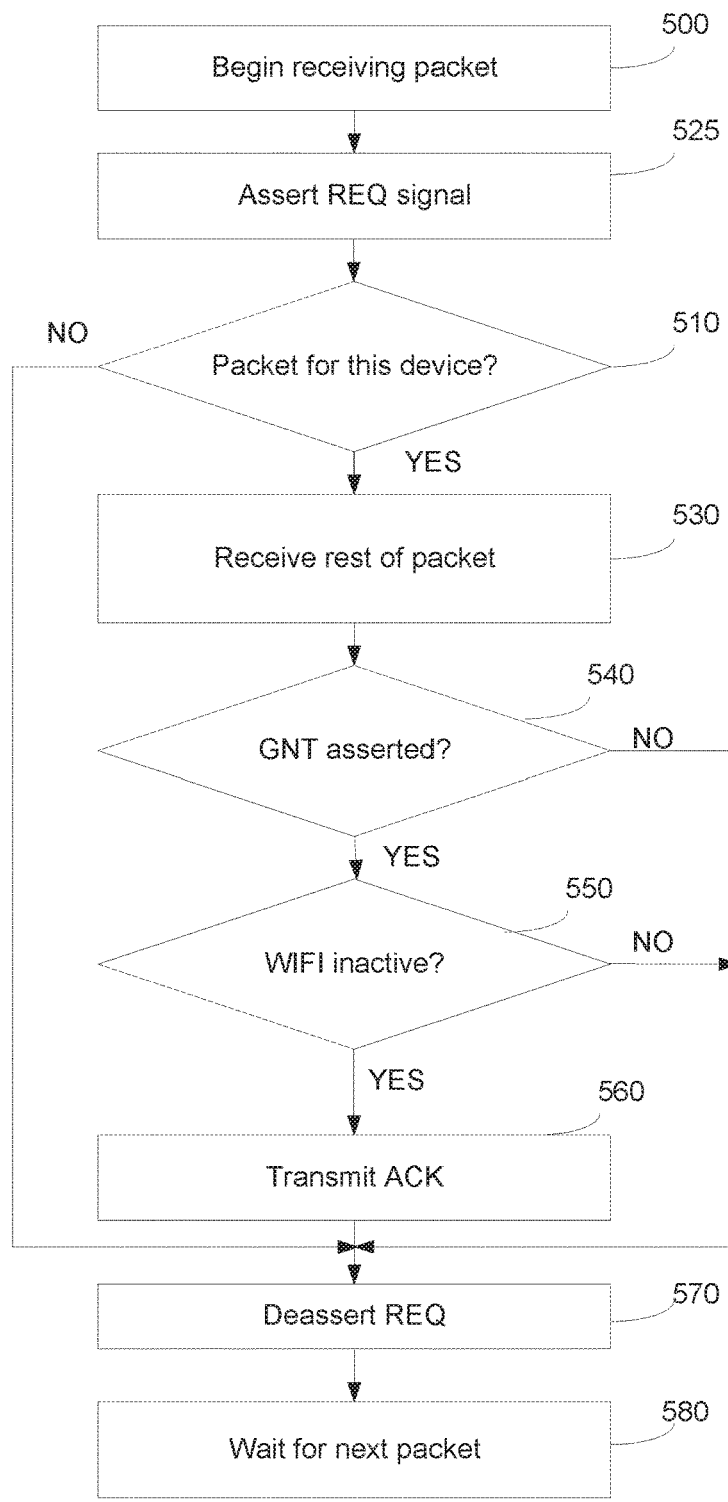

FIG. 5B shows a second representative flowchart which may be executed by the processing unit 21 in the lower-power network controller 20. This flowchart only pertains to incoming packets. This process is similar to FIG. 5A and therefore, only the differences will be described. In FIG. 5B, the lower-power network controller 20 asserts the REQ signal 101 immediately after detecting that an incoming packet is being received, as shown in Process 525. Thus, in this embodiment, the REQ signal 101 is asserted even earlier than it is in FIG. 5A. The sequence then continues as the incoming packet is parsed. When the packet header is received, the lower-power network controller 20 determines whether this packet is for this device, as shown in Process 510. If it is, the sequence continues like that shown in FIG. 5A. If the packet is not for this device, the lower-power network controller 20 deasserts the REQ signal 101, as shown in Process 570.

Figure 6:
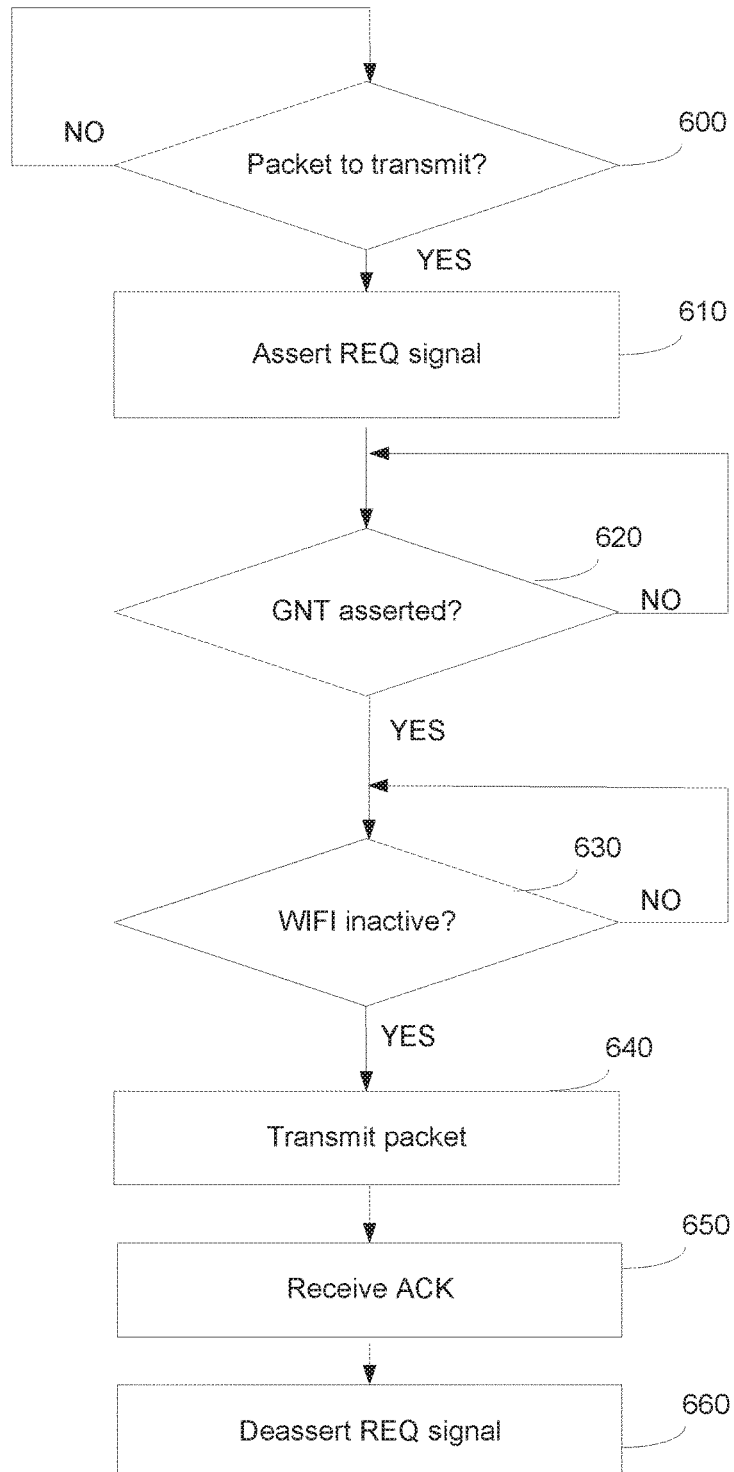
FIG. 6 is a representative flowchart of the transmit process for the lower-power network controller.

The transmit flowchart is shown in FIG. 6 and is much simpler. In this case, the lower-power network controller 20 waits until it has a packet to transmit, as shown in Process 600. When there is a packet, the lower-power network controller 20 asserts the REQ signal 101, as shown in Process 610. The lower-power network controller 20 then waits until the GNT signal 102 is asserted as shown in Process 620. In certain embodiments, the lower-power network controller 20 then checks the status of the WIFI controller 10, as shown in Process 630. If the WIFI controller 10 is currently receiving a packet, the lower-power network controller may wait until the WIFI controller 10 is idle, as shown in Process 630. Of course, in other embodiments, the lower-power network controller 20 may only use the GNT signal 102 to determine when to transmit. Once the lower-power network controller 20 determines that the GNT signal 102 is asserted and the STAT signal 104 is not asserted, it transmits the packet, as shown in Process 640. After the packet has been transmitted, the lower-power network controller 20 waits for and receives the ACK packet, as shown in Process 650. Following receipt of the ACK packet, the lower-power network controller 20 deasserts the REQ signal 101, as shown in Process 660.

In certain embodiments, there may be a long delay between when the lower-power network controller 20 has a packet to transmit and when it actually transmits that packet. For example, in certain network protocols, there is a random MAC delay that the transmitting node must wait before attempting to transmit the packet. This random MAC delay is used in an attempt to minimize collisions on the shared medium. This delay may be as long as 10 milliseconds. This may be an unacceptably long amount of time to hold the shared medium. Thus, in some embodiments, there is a delay between the determination that the lower-power network controller 20 has a packet to transmit (Process 600) and the assertion of the REQ signal 101 (Process 610). In certain embodiments, this delay may be a function of the MAC delay.

For example, the lower-power network controller 20 may determine that it has a packet to transmit. It then determines the random MAC delay that it must wait. This random MAC delay is then used to delay the assertion of the REQ signal 101. For example, if the MAC delay is N microseconds, the REQ signal 101 may be asserted after a delay of N-M microseconds, where M is a predetermined value. The value of M may be selected to allow the WIFI controller 10 to receive the REQ signal 101 from the lower-power network controller 20 and return a GNT signal 102, assuming that the WIFI controller 10 is not transmitting at that time. Thus, in certain embodiments, the delay in the assertion of the REQ signal 101 is a predetermined amount of time less than the random MAC delay that will be used. Of course, the delay before the assertion of REQ signal 101 may be determined in other ways, which may or may not be based on the random MAC delay.

The above configuration allows coexistence between the WIFI controller 10 and a lower-power network controller 20. However, there may be instances where this configuration operates in a suboptimal manner. For example, assume that the WIFI controller 10 is operating at a very high duty cycle, such that it monopolizes or nearly monopolizes the shared medium. The configuration described above ensures the ability of the lower-power network controller 20 to transmit packets whenever necessary through the use of the REQ signal 101. However, due to the high usage of the shared medium by the WIFI controller 10, it may be difficult for packets intended for the lower-power network controller 20 to be detected and received. In other words, FIG. 5A shows that the lower-power network controller 20 asserts the REQ signal 101 once it determines that the incoming packet is destined for this device. However, if the WIFI controller 10 is actively transmitting, it may be difficult to detect the incoming lower-power packet, and thus, the REQ signal 101 is never asserted. Consequently, incoming packets are not received by the lower-power network controller 20.

According to the IEEE802.11 protocol, there are periods of time where no WIFI devices are supposed to be transmitting, known as interframe spacing. The shortest of these interframe spacings may be about 16 μsec. During these periods, it may be possible to detect that a lower-power network protocol signal is present on the shared media.

However, it is unlikely that during this time period, the header 310, which includes preamble and sync fields, of the lower-power network packet are being transmitted. Rather, it is more likely that the data portion of the lower-power network packet is being transmitted. Therefore, it is likely that it is not possible for the lower-power network controller 20 to determine the destination of this lower-power network packet. As noted above, the lower-power network controller 20 only asserts the REQ signal 101 during the header 310 when the preamble and sync fields are received.

In other words, if a lower-power network packet is being transmitted to this device, but the preamble and sync fields is not transmitted during the interframe spacing, the lower-power network controller 20 will not attempt to gain access to the shared media to receive the packet. Consequently, that incoming lower-power packet will not be recognized and will not be received by the lower-power network controller 20. During periods of very high WIFI activity, it may not be possible to receive this incoming packet.

Figure 7:
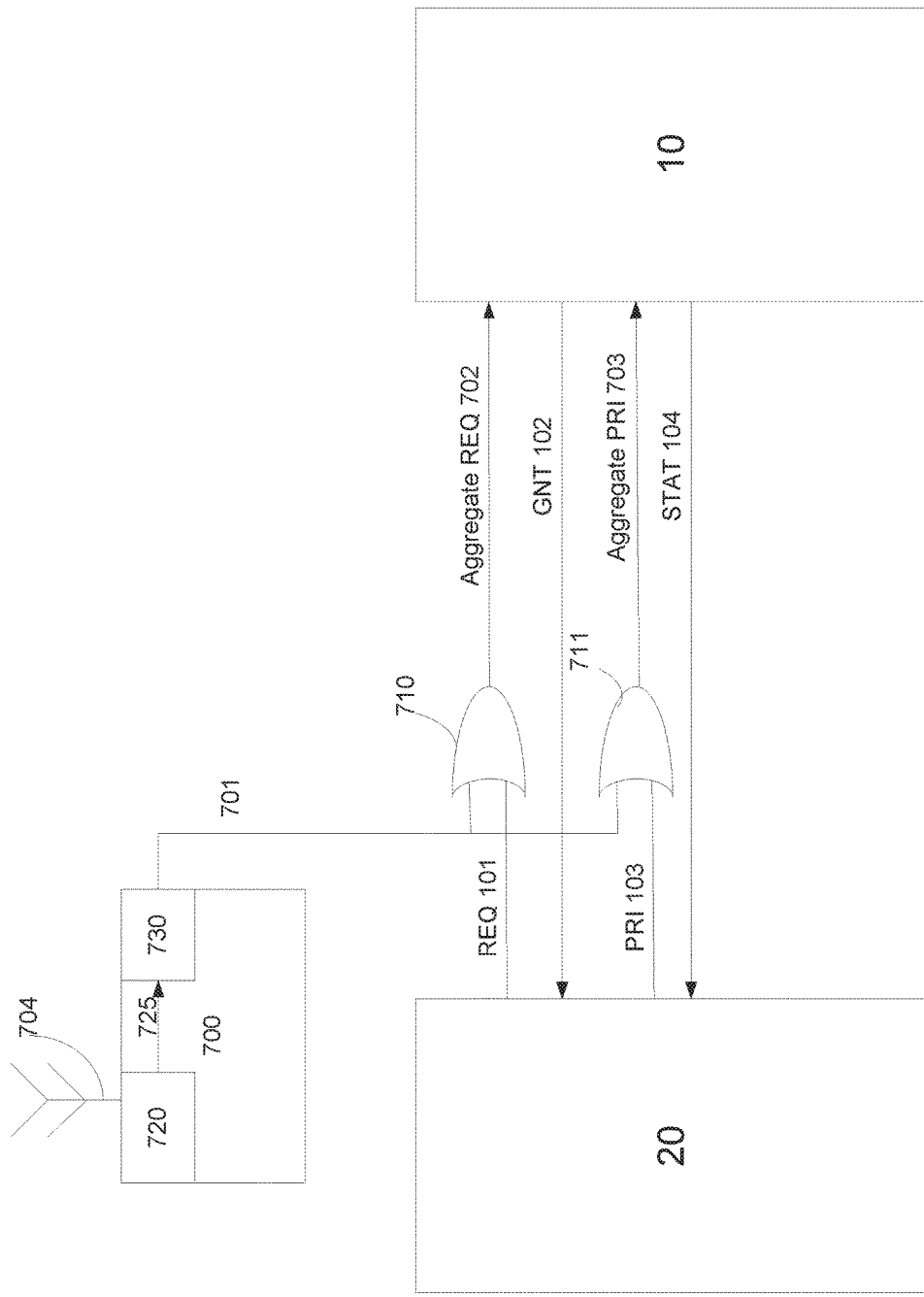
FIG. 7 is a block diagram of a system having both a WIFI controller and a lower-power network controller according to a second embodiment.

FIG. 7 shows a configuration that addresses this issue. FIG. 7 shows the WIFI controller 10, the lower-power network controller 20 and an early packet detection block 700. While FIG. 7 shows these devices as being separate devices, it is understood that in certain embodiments, two or more of these devices may be incorporated into a single integrated circuit. For example, parts of the early packet detection block 700 may be incorporated in the lower-power network controller 20. Thus, FIG. 7 illustrates the interface between these components, regardless of the physical implementation of these components.

As explained above, Packet Traffic Arbitration (PTA) includes a request signal (REQ) 101 which in an indication from the lower-power network controller 20 that it wishes to access the shared medium. The protocol also includes a grant signal (GNT) 102, indicating that the WIFI controller 10 has allowed another device to use the shared medium. In certain embodiments, the mechanism includes a priority signal (PRI) 103, which is used to indicate the importance of the packet that the lower-power network controller 20 wishes to transmit. Finally, in certain embodiments, the mechanism includes a status signal (STAT) 104, which indicates the status of the WIFI controller 10. In certain embodiments, this STAT signal 104 may be asserted when the WIFI controller 10 is receiving a packet and deasserted at all other times. In other embodiments, the STAT signal 104 may be asserted whenever the WIFI controller 10 is transmitting or receiving.

Further, while FIG. 7 shows the arbitration logic contained within the WIFI controller, other embodiments are also possible. For example, the packet arbitration logic may be a separate component, separate from the lower-power network controller 20 and the WIFI controller 10.

As stated above, FIG. 7 shows an early packet detection block 700. This early packet detection block 700 includes a signal detector 720, a timer 730 and an output 701 which is intended to be another REQ signal. This output 701 is logically OR'ed with the REQ signal 101 using OR gate 710, so as to create an aggregate REQ signal 702 which is supplied to the WIFI controller 10. Similarly, the output 701 is logically OR'ed with the PRI signal 103 using OR gate 711 to create an aggregate PRI signal 703. In this way, either the lower-power network controller 20 or the early packet detection block 700 may assert the aggregate REQ signal 702 and the aggregate PRI signal 703. While FIG. 7 shows OR gates 710, 711, it is understood that for active low logic, these gates would be AND gates. FIG. 7 is simply meant to illustrate that the outputs of the two functions are combined to create an aggregate signal, such that whenever either output is asserted, the aggregate signal is asserted.

In certain embodiments, the signal detector 720 is a logic block which has an antenna 704 for monitoring signals on the shared medium. The signal detector 720 may monitor the phase continuity, peak-to-peak deviation, Received Signal Strength Indication (RSSI) threshold, and frequency of signals on the shared medium. By using these parameters, the signal detector 720 is not only able to detect signals on the shared medium, but can also distinguish which network protocol those signals are associated with. For example, the signal detector 720 may be able to distinguish between BLE signals and ZigBee signals.

In one embodiment, the signal detector 720 comprises a spike detector. The spike detector constantly monitors the phase of the incoming signal being received over the shared medium. Any time that the phase of the incoming signal changes by more than a predetermined amount, a spike is recorded. In some embodiments, a large number of spikes within a predetermined measurement period may be indicative of a low signal to noise ratio (SNR), suggesting that no signal is present. A lower number of spikes within the predetermined measurement period may be indicative of a sufficient SNR ratio. A first threshold may be used to distinguish between a low number of spikes and a high number of spikes.

The signal detector 720 may also include a peak-to-peak frequency deviation detector. In operation, the signal detector measures the maximum amplitude received over the predetermined measurement window. The minimum amplitude is also measured over the same measurement window. The difference between these two signals is calculated and compared to an expected peak-to-peak voltage. If the difference is within a second threshold, the signal being transmitted over the shared medium may be associated with the lower-power network.

The signal detector may utilize the outputs of both the spike detector and the peak-to-peak frequency deviation detector to determine when a lower-power packet is being transmitted over the shared medium. For example, when the number of spikes is low and the peak-to-peak frequency deviation is within the second threshold for the measurement window, a counter may be incremented. When the number of spikes is high, the counter is reset. When the number of spikes is low, but the peak-to-peak frequency deviation is outside the second threshold, the counter value remains constant. When the counter reaches a certain value, the signal detector 720 determines that a lower-power network signal is being transmitted on the shared medium. When the signal detector 720 makes this determination, the output 725 is asserted.

In other words, the output 725 of the signal detector 720 is asserted whenever a lower-power network signal is detected on the shared medium. Importantly, the early packet detection block 700 may be able to detect the lower-power network signal, even during times when the preamble or sync character is not being transmitted. For example, the early packet detection block 700 may be able to detect the lower-power network signal during the payload 320.

The output 725 from the signal detector 720 is used by a timer 730. The output 725 starts the timer 730, which asserts the output 701 for a predetermined amount of time. This predetermined amount of time may be long enough so that the lower-power network packet can be re-transmitted in its entirety before the output 701 is deasserted. In some embodiments, this may be between 1 and 255 milliseconds.

In other words, the signal detector 720 monitors the shared medium and when a signal that may be a lower-power network protocol signal is detected, asserts output 725. This output 725 starts a timer 730, which asserts the output 701 for a predetermined amount of time. In certain embodiments, the timer 730 may be a hardware circuit. In other embodiments, the timer 730 may be implemented in software, such as part of the lower-power network controller 20.

Thus, if a lower-power network packet is detected during the interframe spacing, the early packet detection block 700 will request access to the shared medium. When the lower-power packet is re-transmitted, the lower-power network controller 20 will be able to detect the header 310, including the preamble and sync fields, and determine whether the packet is intended for this device. If the packet is intended for this device, the lower-power network controller 20 will assert the REQ signal 101, as explained above. Thus, the timer 730 only needs to assert the output 701 until the header of the re-transmitted lower-power network packet is received. At this point, there are two possible scenarios. In the first scenario, the packet is not intended for this device and the WIFI controller 10 is free to start transmitting again. In this scenario, the aggregate REQ signal 702 is deasserted when the timer 730 expires. In the second scenario, the packet is intended for this device and the lower-power network controller 20 asserts the REQ signal 101, as described above. These two scenarios are shown in FIGS. 8A-8B.

In these diagrams, the REQ signal 101, the GNT signal 102, output 701 and aggregate REQ signal 702 are all active low, meaning that they are asserted when they are at the lower voltage and are inactive at the higher voltage.

The LP Signal 401 represents any lower-power network activity, as detected by the signal detector 720. The WIFI Act signal 410 represents WIFI network activity. This represents both incoming and outgoing packets.

Figure 8A:
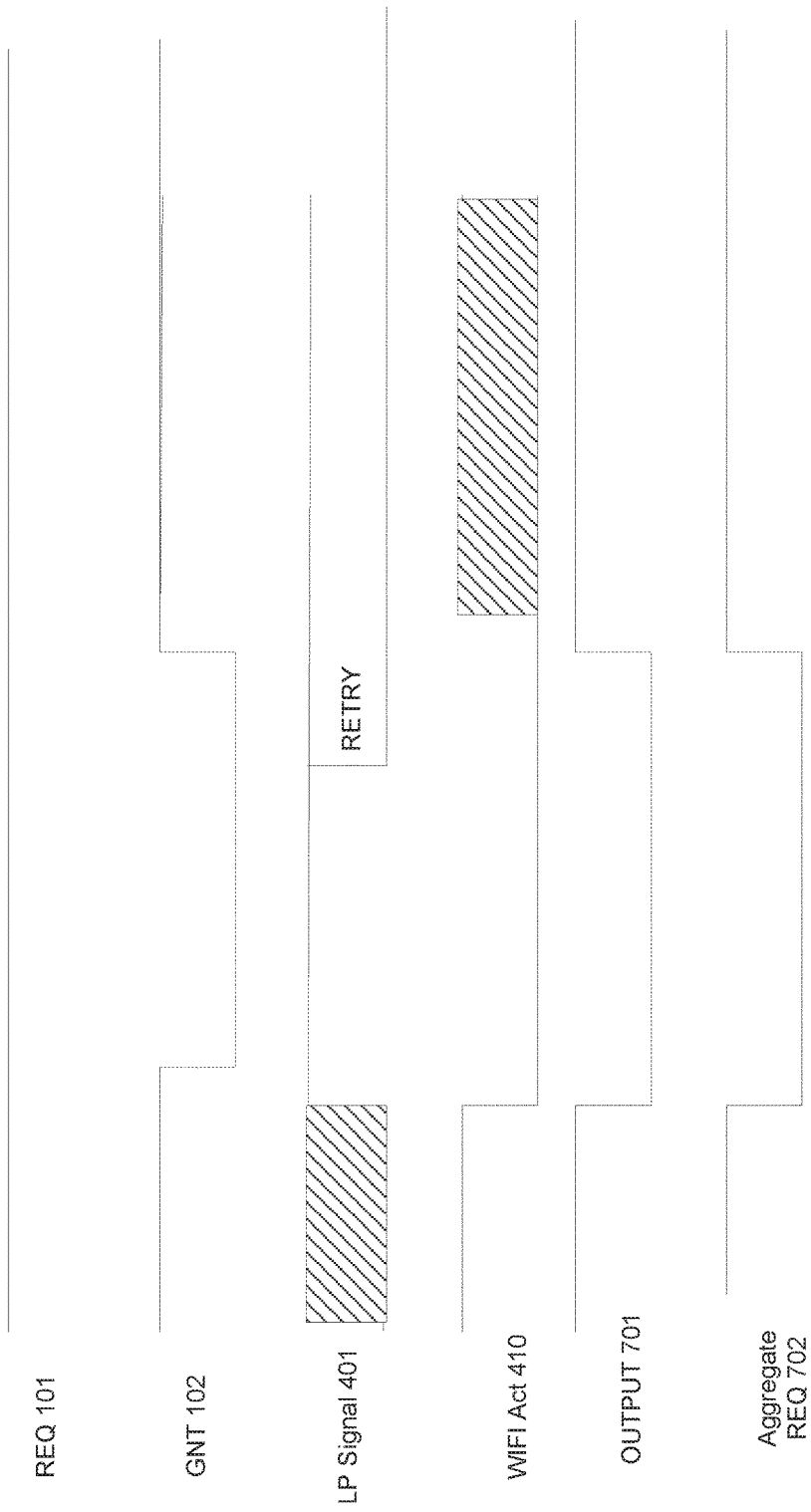

In FIG. 8A, the WIFI activity (WIFI ACT Signal 410) ceases at a point in time. This may correspond to the interframe spacing. At this point, there is some type of lower-power signal (LP Signal 401) detected on the shared medium. Because of this, the output 701 of the early packet detection block 700 is asserted. This causes the aggregate REQ signal 702 to be asserted as well. At a later point in time, the timer 730 expires, causing the output 701 to be deasserted. The duration of the output 701 may be sufficiently long so that the lower-power packet is being retransmitted when the timer 730 expires. In this graph, the lower-power network controller 20 determines that this lower-power packet is not intended for this device. Therefore, it never asserts the REQ signal 101. Consequently, once the timer 730 expires, the aggregate REQ signal 702 is also deasserted, and the WIFI controller 10 is free to access the shared medium. The WIFI controller 10 deasserted the GNT signal 102 and may begin transmitting WIFI packets.

In FIG. 8B, the WIFI activity (WIFI ACT Signal 410) ceases at a point in time. This may correspond to the interframe spacing. At this point, there is some type of lower-power signal (LP Signal 401) detected on the shared medium. Because of this, the output 701 of the early packet detection block 700 is asserted. This causes the aggregate REQ signal 702 to be asserted as well. At a later point in time, the timer 730 expires, causing the output 701 to be deasserted. The duration of the output 701 may be sufficiently long so that the lower-power packet is being retransmitted when the timer 730 expires. In this graph, before the deassertion of the output 701, the lower-power network controller 20 determines that this lower-power packet is intended for this device. Therefore, it asserts the REQ signal 101. Consequently, once the timer 730 expires, the aggregate REQ signal 702 remains asserted, since the lower-power network controller 20 asserted the REQ signal 101.

Thus, in one embodiment, an early packet detection block 700 is used to detect the presence of a lower-power network signal on the shared medium and to assert the output 701 for a predetermined period of time. This assertion of the output 701 causes the WIFI controller 10 to relinquish control of the shared medium and allows the lower-power network controller 20 to be able to detect the lower-power packet (or its re-transmission). After this, the lower-power network controller 20 operates as shown in FIG. 5A or FIG. 5B.

In certain embodiments, the early packet detection block 700 may be incorporated into the lower-power network controller 20. Further, in certain embodiments, the early packet detection block 700 utilizes the same logic as is used for determining whether a packet is destined for this device. In other words, in certain embodiments, the lower-power network controller 20 can either be in early detection mode or in normal operating mode.

Figure 9:
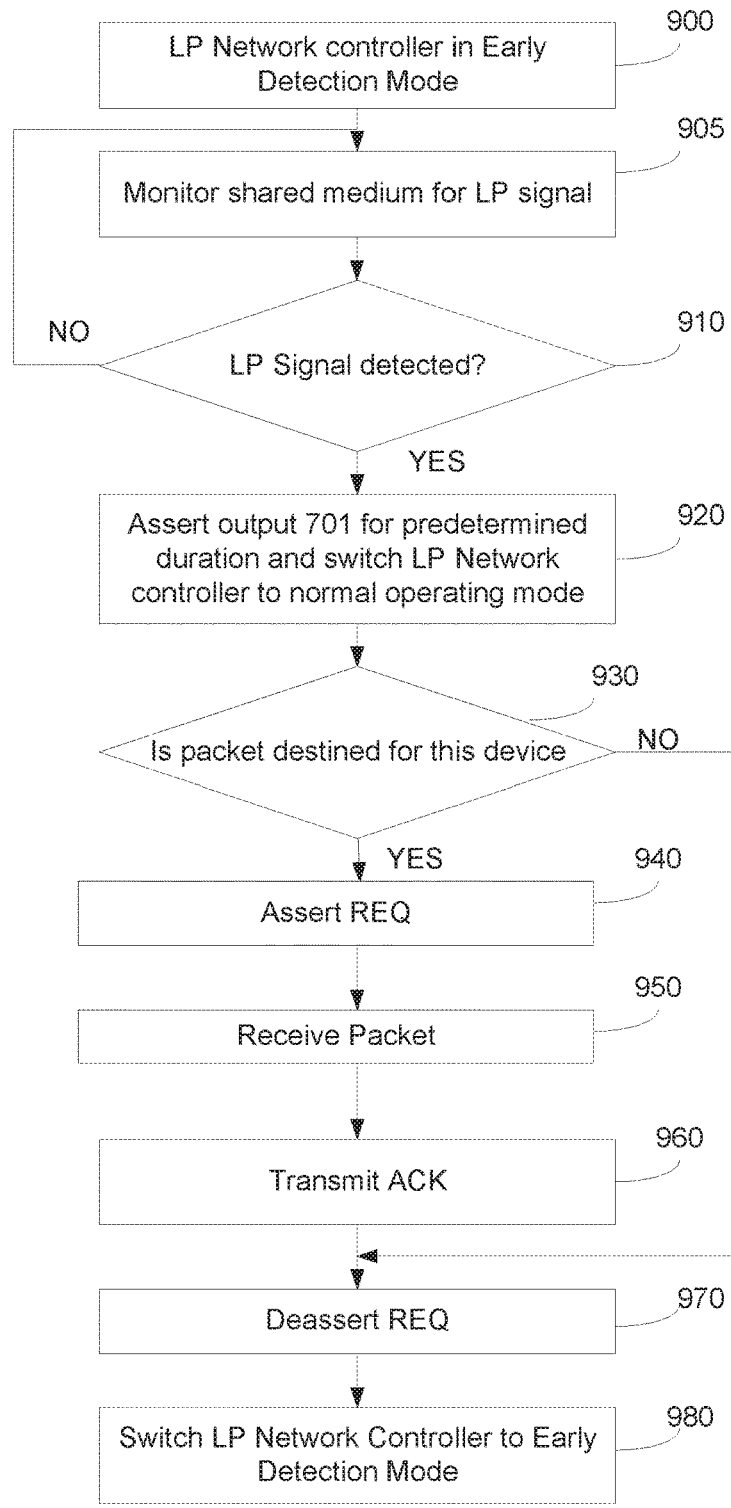
FIG. 9 is a representative flowchart of the receive process for the lower-power network controller of FIG. 7.

Thus, in this configuration, it is necessary to switch the lower-power network controller 20 between these two modes at the appropriate times. FIG. 9 shows a flowchart illustrating this sequence. First, as shown in Process 900, the lower-power network controller 20 is put in early detection mode. In this mode, the lower-power network controller operates in accordance with the description associated with early packet detection block 700 described above. In this mode, the lower-power network controller 20 continuously monitors the shared medium for a lower-power network signal, as shown in Process 905. If a lower-power network signal is detected, as determined in Process 910, the lower-power network controller 20 asserts the output 701 for a predetermined duration, as described earlier. Further, at this time, the lower-power network controller 20 is switched to normal operating mode, as shown in Process 920. If a lower-power signal is not detected, as determined in Process 910, the lower-power network controller 20 continues monitoring the shared medium. Processes 930-970 are the same as Processes 510-530 and 560-570, shown in FIG. 5A. The checks for grant and WIFI activity are omitted in FIG. 9 for clarity. However, these checks may also be performed, as described with respect to FIG. 5A. The predetermined duration shown in Process 920 is sufficiently long such that, of the packet is destined for this device, the request signal is asserted in Process 940 before the output 701 is deasserted, so that the aggregate REQ signal 702 is continuously asserted, as shown in FIG. 8B. After the lower-power network packet is received and the ACK is transmitted, the REQ signal is deasserted. Once this is complete, the lower-power network controller 20 is switched back to early detection mode, as shown in Process 980. If the packet is not destined for this device, the request signal may be deasserted, as shown in Process 970 to avoid wasting bandwidth. The lower-power network controller 20 is then switched back to early detection mode, as shown in Process 980.

In the event that the packet is not destined for this device, the request signal may be deasserted and early detection mode may be enabled again. However, one possible issue associated with this approach is that the early packet detection block 700 may immediately be triggered again by the packet that is currently being transmitted. However, it has already been determined that this packet is not destined for this device. There are several ways that this may be addressed.

In one embodiment, the lower-power network controller 20 parses the header during Process 930. Information in this header will include the number of bytes in the payload. Thus, based on this number of bytes and the transmission rate, the time that is required for this packet to be transmitted can be determined. Thus, in this embodiment, the lower-power network controller 20 may set a timer and may not switch back to the early detection mode (see Process 980) until the expiration of this timer.

However, in this embodiment, it is possible that a second packet begins transmitting during this time. In this scenario, it may be beneficial to determine if this second packet is intended for this device. Thus, the early packet detection block 700 may record the RSSI that was observed during the previous detection (see Process 910). In the event that this packet is not destined for this device, the request signal is released and the lower-power network controller 20 reverts back to early detection mode, as shown in Process 980. As described above, a timer may be set that signifies when the transmission of the present packet will be completed. If the early detection triggers again before this timer expired, the request signal is only asserted if the RSSI being detected is greater than the recorded RSSI_plus some margin, or if the RSSI being detected is less than the recorded RSSI less some margin. After timer expires, this RSSI condition will be ignored and the request signal will be asserted whenever the early detection triggers.

The sequence shown in FIG. 9 is also applicable if the early packet detection block 700 is separate from the lower-power network controller 20. In this embodiment, the action shown in Process 980 is not necessary and it is not necessary to switch modes, as shown in Process 920. All other actions remain unchanged.

Further, while the term "Destination Address" is used, it is understood that this term refers to any mechanism of designating the target of the packet. For example, this term is meant to include "Access Addresses" used in BLE. This term also covers terms used in other lower-power protocols.

In certain embodiments, the lower-power network protocol may utilize CRC (cyclic redundant codes) in the header, the payload or both. In these embodiments, the receiving device may not transmit an ACK packet if the CRC is incorrect. Further, in certain embodiments, a CRC error will cause the lower-power network controller 20 to deassert the REQ signal 101.

As stated above, the above configurations are used to allow lower-power network traffic to be detected even in cases of high duty-cycle WIFI transmissions. In other words, in scenarios where the WIFI controller 10 is transmitting at a high duty cycle, this configuration allows for detection of lower-power network traffic. If such traffic is detected, the aggregate REQ signal 702 is asserted so that WIFI transmissions from the WIFI controller 10 are suspended so that the lower-power network packet can be retransmitted and properly detected.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system comprising:
a WIFI controller, comprising an aggregate request signal used as an input to request exclusive access to a shared medium and a grant signal used as an output indicating that the exclusive access to the shared medium has been granted;
a lower-power network controller, comprising a processing unit and an associated memory element, wherein the lower-power network controller is configured to assert a request signal if an incoming lower-power network packet is destined for this controller or if an outgoing lower-power network packet is to be transmitted; and
an early packet detection block to detect a lower-power network signal on the shared medium and assert a request signal for a predetermined duration in response to the detection, wherein the early packet detection block monitors phase, frequency and/or amplitude of signals on the shared medium to detect a lower-power network signal.

2. The system of claim 1, wherein the WIFI controller and the lower-power network controller operate in the same frequency spectrum.

3. The system of claim 1, where the predetermined duration is sufficiently long for a lower-power network packet to be re-transmitted.

4. The system of claim 1, wherein at least a portion of the early packet detection block is incorporated in the lower-power network controller.

5. A system comprising:
a WIFI controller, comprising an aggregate request signal used as an input to request exclusive access to a shared medium and a grant signal used as an output indicating that the exclusive access to the shared medium has been granted;
a lower-power network controller, comprising a processing unit and an associated memory element, wherein the lower-power network controller is configured to assert a request signal if an incoming lower-power network packet is destined for this controller or if an outgoing lower-power network packet is to be transmitted; and
an early packet detection block to detect a lower-power network signal on the shared medium and assert a request signal for a predetermined duration in response to the detection, wherein the lower-power network controller comprises circuitry, configurable to operate in two modes; a first mode where it operates as the early packet detection block and a second mode where it operates in a normal operating mode where a header of a lower-power network packet is detected and decoded.

6. The system of claim 5, wherein the lower-power network controller switches from the first mode to the second mode after the early packet detection block asserts the request signal.

7. The system of claim 6, wherein the lower-power network controller switches from the second mode to the first mode after the lower-power network controller determines the lower-power network packet is not destined for this device or after the lower-power network packet has been received.

8. The system of claim 5, wherein the WIFI controller and the lower-power network controller operate in the same frequency spectrum.

9. The system of claim 5, where the predetermined duration is sufficiently long for a lower-power network packet to be re-transmitted.

10. The system of claim 5, wherein the early packet detection block monitors phase and amplitude of signals on the shared medium to detect a lower-power network signal.

11. A method of simultaneously operating a WIFI network and a lower-power network, comprising:
   monitoring phase, frequency and/or amplitude of signals on a shared medium for lower-power network signals;
   asserting a first request signal to a WIFI controller for a predetermined duration when a lower-power network signal is detected;
   using a lower-power network controller to determine that an incoming lower-power network packet is being received and is intended for this lower-power network controller;
   asserting a second request signal if the incoming lower-power network packet is intended for this lower-power network controller; and
   asserting a grant signal from the WIFI controller in response to the first request signal and the second request signal, wherein the WIFI controller suspends transmission of outgoing packets while the grant signal is asserted.

12. The method of claim 11, where the predetermined duration is sufficiently long for the incoming lower-power network packet to be re-transmitted.

13. The method of claim 12, wherein the predetermined duration is sufficiently long so that the second request signal is asserted prior to the first request signal being deasserted.

14. The method of claim 11, wherein the lower-power network controller is used to monitor the shared medium for lower-power network signals.

15. The method of claim 14, further comprising:
   switching the lower-power network controller from a first mode, where it monitors the shared medium, to a second mode, where it determines that an incoming lower-power network packet is being received and is intended for this lower-power network controller, where the switch from the first mode to the second mode occurs after the lower-power network signal is detected.

16. The method of claim 15, further comprising:
   switching the lower-power network controller from the second mode to the first mode after the incoming lower-power network packet has been received.

17. The method of claim 15, further comprising:
   switching the lower-power network controller from the second mode to the first mode after the lower-power network controller determines that the incoming lower-power network packet is not destined for this device.

18. The method of claim 11, wherein the lower-power network controller deasserts the first request signal if it is determined that the incoming lower-power network packet is not intended for this lower-power network controller.

19. The method of claim 18, wherein the lower-power network controller determines a period of time required to transmit the incoming lower-power network packet.

20. The method of claim 19, wherein the first request signal is not asserted again until after the period of time has elapsed.

21. The method of claim 19, further comprising:
   after deasserting the first request signal, continuing to monitor the shared medium for lower-power network signals until the period of time has elapsed, wherein the first request signal is only asserted if a RSSI being detected is different from a RSSI of the incoming lower-power network packet by some margin.

* * * * *